United States Patent
Yoshino

(10) Patent No.: US 12,553,767 B2
(45) Date of Patent: Feb. 17, 2026

(54) DIAGNOSTIC APPARATUS, MOVING BODY, COMPUTER READABLE STORAGE MEDIUM, AND DIAGNOSTIC METHOD

(71) Applicant: HONDA MOTOR CO., LTD., Tokyo (JP)

(72) Inventor: Fumihiro Yoshino, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 543 days.

(21) Appl. No.: 18/177,776

(22) Filed: Mar. 3, 2023

(65) Prior Publication Data

US 2023/0316827 A1    Oct. 5, 2023

(30) Foreign Application Priority Data

Mar. 31, 2022    (JP) ................................ 2022-059739

(51) Int. Cl.
| | |
|---|---|
| G01H 1/00 | (2006.01) |
| F16C 19/52 | (2006.01) |
| G01H 11/06 | (2006.01) |
| G01H 17/00 | (2006.01) |
| G01M 13/00 | (2019.01) |
| G01M 13/021 | (2019.01) |
| G01M 13/028 | (2019.01) |
| G01M 13/045 | (2019.01) |
| G01M 17/007 | (2006.01) |
| G07C 5/08 | (2006.01) |

(52) U.S. Cl.
CPC ........... *G01H 1/003* (2013.01); *F16C 19/527* (2013.01); *G01H 11/06* (2013.01); *G01H 17/00* (2013.01); *G01M 13/00* (2013.01); *G01M 13/021* (2013.01); *G01M 13/028* (2013.01); *G01M 13/045* (2013.01); *G01M 17/007* (2013.01); *G07C 5/0808* (2013.01); *G07C 2205/02* (2013.01)

(58) Field of Classification Search
CPC ........ G01H 1/003; G01H 11/06; G01H 17/00; F16C 19/527; G01M 13/00; G01M 13/021; G01M 13/028; G01M 13/045; G01M 17/007; G07C 5/0808; G07C 2205/02
See application file for complete search history.

(56) References Cited

U.S. PATENT DOCUMENTS

| | | | |
|---|---|---|---|
| 2011/0301872 A1* | 12/2011 | Hedin ................. | G01M 13/028 702/34 |
| 2019/0137360 A1* | 5/2019 | Miyasaka .............. | G01H 1/003 |
| 2020/0368908 A1* | 11/2020 | Mori ..................... | B25J 9/1674 |

FOREIGN PATENT DOCUMENTS

JP    6995969 B1    1/2022

* cited by examiner

*Primary Examiner* — Ryan D Walsh

(57) ABSTRACT

A diagnostic apparatus, for diagnosing a state of equipment including a rotating component that rotates by force transmitted from a rotating shaft, includes: a vibration information acquisition section for acquiring vibration information including waveform information of vibration of the rotating component; an analysis section for decomposing a vibration waveform into frequency components and outputting values of vibration levels for each frequency component; and a determination section for determining a presence or absence of an abnormality in at least one of the rotating shaft and the rotating component. For a range from a first frequency, which is smaller than a rotation frequency of the rotating shaft, to the rotation frequency, the determination section compares, for each frequency component, a value of a vibration level with a normal value thereof, and determine a presence or absence of an abnormality in at least one of the rotating shaft and the rotating component.

20 Claims, 11 Drawing Sheets

DIAGNOSTIC APPARATUS, MOVING BODY, COMPUTER READABLE STORAGE MEDIUM, AND DIAGNOSTIC METHOD

The contents of the following Japanese application are incorporated herein by reference.

No. 2022-059739 filed in JP on Mar. 31, 2022.

BACKGROUND

1. Technical Field

The present invention relates to a diagnostic apparatus, a moving body, a computer readable storage medium, and a diagnostic method.

2. Related Art

Patent Document 1 discloses a diagnostic apparatus of rotary equipment including a vibration detection apparatus that detects vibration when the rotary equipment is rotating and a vibration analysis apparatus that analyzes the vibration detected by the vibration detection apparatus.

CITATION LIST

Patent Document

Patent Document 1: Japanese patent No. 6995969

DESCRIPTION OF EXEMPLARY EMBODIMENTS

Hereinafter, embodiments of the present invention will be described, but the embodiments do not limit the invention according to the claims. In addition, not all of the combinations of features described in the embodiments are essential to the solving means of the invention.

(Outline of Moving Body 100)

Figure 1:
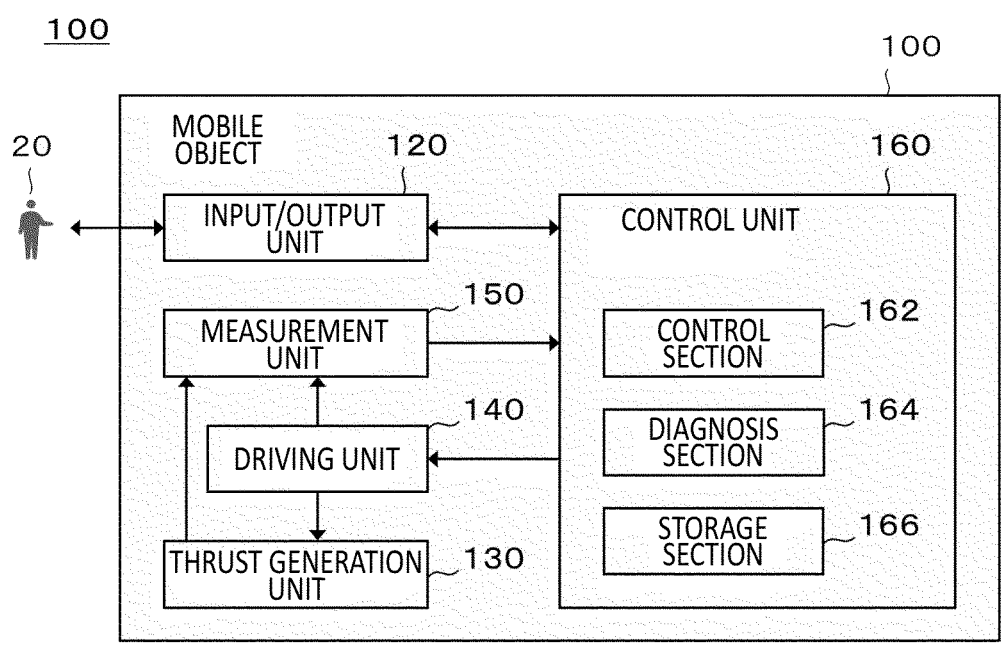
FIG. 1 schematically illustrates an example of a system configuration of a moving body 100.

FIG. 1 schematically illustrates an example of a system configuration of a moving body 100. In the present embodiment, details of the moving body 100 will be described by using, as an example, a case where the moving body 100 moves according to an instruction of a user 20. The user 20 may be a passenger of the moving body 100 or an operation manager who manages the operation of the moving body 100.

In the present embodiment, the moving body 100 includes, for example, an input/output unit 120, a thrust generation unit 130, a drive unit 140, a measurement unit 150, and a control unit 160. In the present embodiment, the control unit 160 includes a control section 162, a diagnosis section 164, and a storage section 166.

In the present embodiment, the input/output unit 120, the thrust generation unit 130, the drive unit 140, the measurement unit 150, and the control unit 160 are mounted on the moving body 100, for example. In the present embodiment, the input/output unit 120, the drive unit 140, the measurement unit 150, and the control unit 160 are configured to be able to transmit and receive information to and from each other, for example.

The moving body 100 moves, for example, carrying a person or an object. The moving body 100 may move by being steered by the user 20 or may move autonomously.

Examples of the moving body 100 include a vehicle, a flying object, a marine vessel, and the like. Examples of the vehicle include an automobile, a motorcycle, a bicycle, a standing vehicle having a power unit, a work machine, a train, and the like. Examples of the automobile include an electric vehicle, a fuel cell vehicle (FCV), a hybrid vehicle, a compact commutator, an electric cart, and the like. Examples of the motorcycle include a motorcycle, a three-wheeled motorcycle, and the like. The bicycle may be an electric motor-equipped bicycle. The electric motor-equipped bicycle may be an electric bicycle or an electric assist bicycle. Examples of the work machine include a forklift, a cultivator, a lawn mower and the like. Examples of the flying object include an air plane, an air ship or a balloon, a hot-air balloon, a helicopter, a drone, and the like. Examples of the marine vessel include a ship, a hovercraft, a water bike, a submarine, a submersible craft, an underwater scooter, and the like.

In the present embodiment, the input/output unit 120 receives an input of an instruction or operation from the user 20, for example. The input/output unit 120 may acquire information indicating the type and operation amount of the operation instructed to the moving body 100 by the user 20. The input/output unit 120 presents, for example, various types of information. The input/output unit 120 may output various types of information regarding the state of the moving body 100.

The input/output unit 120 includes, for example, various input apparatuses and/or various output apparatuses. Examples of the input apparatus include a steering wheel, an accelerator, a brake, a shift lever, a direction indicator, and the like. Other examples of the input apparatus include a keyboard, a pointing device, a touch panel, a camera, a microphone, a voice input system, a gesture input system, and the like. Examples of the output apparatus include a display apparatus, a speaker, and the like. Examples of the display apparatus include a display, a projector, and the like.

In the present embodiment, the thrust generation unit 130 generates the thrust of the moving body 100, for example. The thrust generation unit 130 may generate the thrust of the moving body 100 by using the driving force output from the drive unit 140. Examples of the thrust generation unit 130 include a wheel, a propeller, and the like.

In the present embodiment, the drive unit 140 outputs, for example, driving force for moving the moving body 100. The drive unit 140 may output braking force for braking the moving body 100. The drive unit 140 operates, for example, on the basis of an instruction from the control unit 160. Details of the drive unit 140 will be described later.

In the present embodiment, the measurement unit 150 measures various physical quantities indicating the state of the moving body 100. The measurement unit 150 may measure various physical quantities indicating the state of the drive unit 140. The measurement unit 150 may output, to the control unit 160, information indicating a measurement result.

The measurement unit 150 may include various sensors. Examples of the sensor include a vibration sensor, an acoustic emission (AE) sensor, a current sensor, a voltage sensor, a rotation sensor (may be referred to as a resolver), a temperature sensor, a pressure sensor, and the like.

The vibration sensor detects, for example, vibration caused by failure or deterioration of a component (examples thereof include a bearing, a gear, a shaft, and the like). The AE sensor detects, for example, an elastic wave caused by a failure or deterioration of a component. The current sensor and/or the voltage sensor detect a change in a waveform caused by a failure or deterioration of a component. The rotation sensor detects a change in a waveform caused by a failure or deterioration of the motor. The temperature sensor measures, for example, an oil temperature, a water temperature, an air temperature, a surface temperature of a component, an internal temperature of the component, and the like. The temperature sensor detects a temperature change caused by a failure or deterioration of a component. Accordingly, a failure of a component or a sign of the failure can be detected.

In the present embodiment, the control unit 160 controls, for example, the moving body 100. In one embodiment, the control unit 160 manages the state of each section of the moving body 100. For example, the control unit 160 acquires a measurement result indicating the state of each section of the moving body 100 from the measurement unit 150. The control unit 160 may diagnose the state of each section of the moving body 100 (may be simply referred to as "diagnose each section"). In another embodiment, the control unit 160 may control the operation of each section of the moving body 100. For example, the control unit 160 controls the operation of the drive unit 140.

In the present embodiment, for example, the control section 162 controls the operation of each section of the moving body 100. The control section 162 may acquire, from the measurement unit 150, a measurement result indicating the state of each section of the moving body 100. The control section 162 may control the operation of each section of the moving body 100 on the basis of the measurement result. For example, the control section 162 controls the operation of the drive unit 140. The control section 162 may control the drive unit 140 to control the magnitude of the driving force for moving the moving body 100. Details of the control section 162 will be described later.

In the present embodiment, the diagnosis section 164 diagnoses, for example, the state of the moving body 100. The diagnosis section 164 may diagnose the state of at least some of a plurality of components (may be referred to as component parts) constituting the moving body 100. The diagnosis section 164 diagnoses, for example, the state of the drive unit 140. The diagnosis section 164 may diagnose the state of at least some of the plurality of components (may be referred to as component parts) constituting the drive unit 140. Accordingly, the diagnosis section 164 can detect, for example, a failure of a component or a sign of the failure. Details of the diagnosis section 164 will be described later.

In the present embodiment, the storage section 166 stores (may be referred to as "contains") various types of information. In one embodiment, the storage section 166 contains various types of information used for information processing in the moving body 100. In another embodiment, the storage section 166 contains various types of information generated by information processing in the moving body 100. Details of the storage section 166 will be described later.

The user 20 may be an example of an end-user, and the moving body 100 may be an example of equipment. The thrust generation unit 130 may be an example of a thrust generation section. The drive unit 140 may be an example of a drive apparatus or a drive section. The drive unit 140 may be an example of reverse thrust equipment or braking equipment. The control unit 160 may be an example of a control apparatus, a diagnostic apparatus, or a diagnosis section. The control section 162 may be an example of the control apparatus, a required driving force decision section, a diagnosis driving force decision section, or a drive control section. The diagnosis section 164 may be an example of a diagnostic apparatus or a diagnosis section. The storage section 166 may be an example of a storage apparatus.

(Outline of Drive Unit 140)

Figure 2:
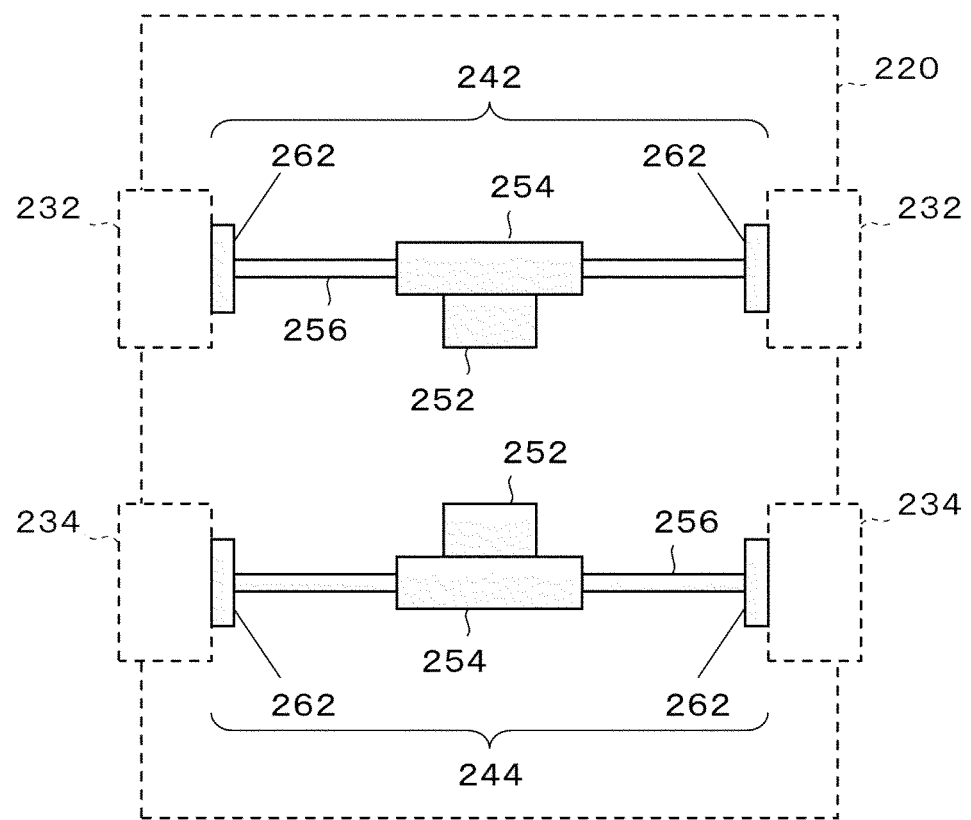
FIG. 2 schematically illustrates an example of a system configuration of a drive unit 140.

FIG. 2 schematically illustrates an example of a system configuration of the drive unit 140. In FIG. 2, details of a system configuration of the drive unit 140 will be described by using, as an example, a case where the moving body 100 is a vehicle. In FIG. 2, for the purpose of facilitating understanding of the drive unit 140, the details of the system configuration of the drive unit 140 will be described by using, as an example, a case where the moving body 100 includes a vehicle body 220, a pair of front wheels 232, a pair of rear wheels 234, and the drive unit 140.

In the present embodiment, the drive unit 140 includes a front wheel drive unit 242 and a rear wheel drive unit 244. In the present embodiment, each of the front wheel drive unit 242 and the rear wheel drive unit 244 includes a motor 252, a gear box 254, a shaft 256, and a brake 262.

In the present embodiment, one of the front wheel drive unit 242 and the rear wheel drive unit 244 generates at least a part (may be referred to as first driving force) of the driving force for moving the moving body 100. In the present embodiment, the other one of the front wheel drive unit 242 and the rear wheel drive unit 244 adjusts the magnitude of the driving force output by the drive unit 140. For example, the other one of the front wheel drive unit 242 and the rear wheel drive unit 244 adjusts the magnitude of the driving force output from the drive unit 140 by (i) generating the remaining part (may be referred to as second driving force) of the driving force for moving the moving body 100 or (ii) generating braking force for braking the moving body 100.

In one embodiment, the other one of the front wheel drive unit 242 and the rear wheel drive unit 244 generates the braking force by operating the motor 252 or the gear box 254 such that the driving force output from the motor 252 cancels the first driving force output from one of the front wheel drive unit 242 and the rear wheel drive unit 244. In another embodiment, the other one of the front wheel drive unit 242 and the rear wheel drive unit 244 generates the braking force by operating the brake 262.

In the present embodiment, the motor 252 generates power. In the present embodiment, the gear box 254 transmits the power generated by the motor 252 to the front wheel 232 or the rear wheel 234. The gear box 254 is constituted by one or more components. The gear box 254 includes, for example, rotating components such as bearings and gears. In the present embodiment, the shaft 256 transmits the power generated by the motor 252 to the front wheel 232 or the rear wheel 234.

The pair of front wheels 232 may be an example of the thrust generation section. The pair of rear wheels 234 may be an example of the thrust generation section. One of the front wheel drive unit 242 and the rear wheel drive unit 244 may be an example of a generation apparatus or a generation section. The other one of the front wheel drive unit 242 and the rear wheel drive unit 244 may be an example of an adjustment apparatus or an adjustment section. The motor 252 may be an example of an electric motor. The motor 252 included in the other one of the front wheel drive unit 242 and the rear wheel drive unit 244 may be an example of the reverse thrust equipment. The gear box 254 included in the other one of the front wheel drive unit 242 and the rear wheel drive unit 244 may be an example of the reverse thrust equipment. The brake 262 may be an example of the braking equipment.

One Example of Another Embodiment

In the present embodiment, the details of the drive unit 140 have been described by using, as an example, a case where each of the front wheel drive unit 242 and the rear wheel drive unit 244 includes the motor 252, the gear box 254, the shaft 256, and the brake 262. However, the drive unit 140 is not limited to the present embodiment. In another embodiment, one of the front wheel drive unit 242 and the rear wheel drive unit 244 may not include the motor 252.
(Outline of Control Unit 160)

Figure 3:
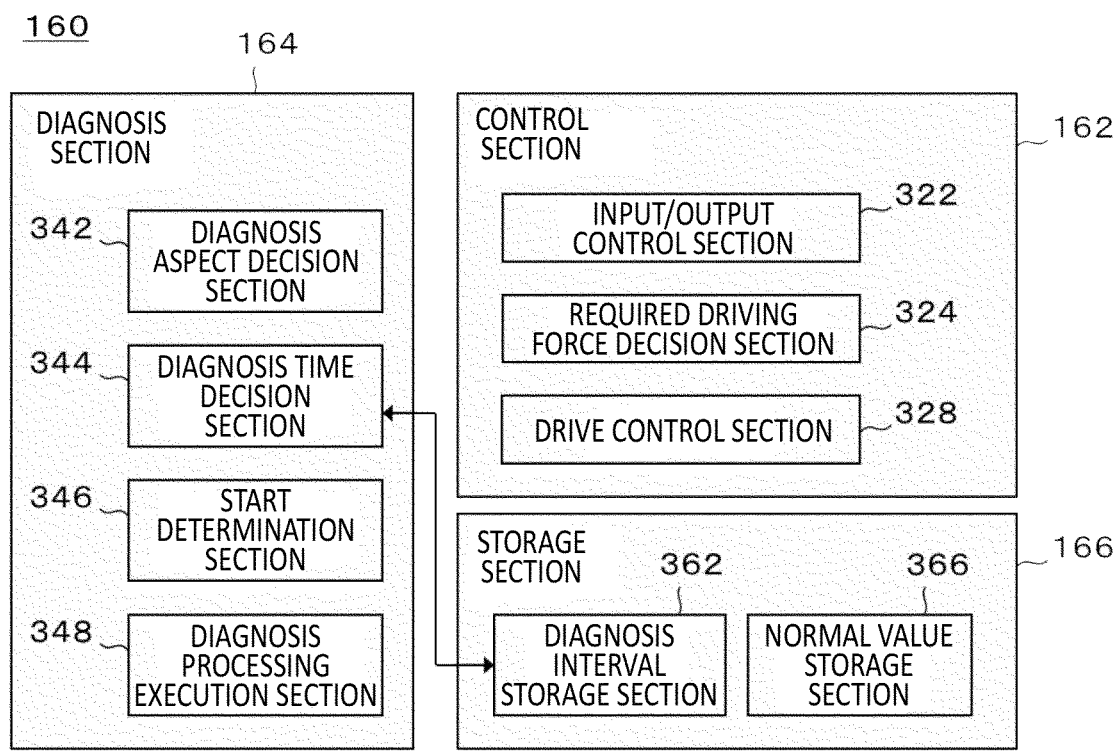
FIG. 3 schematically illustrates an example of a system configuration of a control unit 160.

FIG. 3 schematically illustrates an example of a system configuration of the control unit 160. According to the present embodiment, details of information processing in the control unit 160 will be described with reference to FIG. 3 by using, as an example, a case where the diagnosis section 164 diagnoses a state of the front wheel drive unit 242 or a part of the components constituting the front wheel drive unit 242.

In the present embodiment, details of the control unit 160 will be described by using, as an example, a case where the moving body 100 moves forward (for example, an upper side in FIG. 2). In this case, (i) the motor 252, the gear box 254, and the shaft 256 of the front wheel drive unit 242 generate the driving force for moving the moving body 100 forward, and (ii) the brake 262 of the front wheel drive unit 242, and/or the rear wheel drive unit 244 adjust the magnitude of the driving force output by the drive unit 140.

According to one embodiment, (i) the motor 252, the gear box 254 and the shaft 256 of the front wheel drive unit 242 generate the driving force for moving the moving body 100 forward, and (ii) the brake 262 of the front wheel drive unit 242, and/or the rear wheel drive unit 244 generate braking force for canceling the driving force for moving the moving body 100 forward. According to another embodiment, (i) the motor 252, the gear box 254 and the shaft 256 of the front wheel drive unit 242 generate a part of the driving force for moving the moving body 100 forward, and (ii) the rear wheel drive unit 244 generates the remaining part of the driving force for moving the moving body 100 forward.

In the present embodiment, the control section 162 includes an input/output control section 322, a required driving force decision section 324, and a drive control section 328. In the present embodiment, the diagnosis section 164 includes a diagnosis aspect decision section 342, a diagnosis time decision section 344, a start determination section 346, and a diagnosis processing execution section 348. In the present embodiment, the storage section 166 includes a diagnosis interval storage section 362 and a normal value storage section 366.

In the present embodiment, the input/output control section 322 controls input/output between the control unit 160 and each section of the moving body 100. The input/output control section 322 acquires, for example, information indicating the content of an instruction of the user 20 output by the input/output unit 120. The input/output control section 322 acquires, for example, information indicating a measurement result output by the measurement unit 150. The input/output control section 322 outputs, to the drive unit 140, information for controlling the operation of the drive unit 140, for example.

In the present embodiment, the required driving force decision section 324 decides the magnitude of the driving force (may be referred to as required driving force) required to move the moving body 100 on the basis of the instruction of the user 20. The required driving force decision section 324 may output, to the drive control section 328, information indicating the magnitude of the required driving force.

The required driving force decision section 324 decides the magnitude of the required driving force on the basis of, for example, (i) the content of the instruction of the user 20 and (ii) a performance curve regarding the movement of the moving body 100. The performance curve is decided on the basis of, for example, the mass of the moving body 100, the movement resistance of the moving body 100, and the like. When the moving body 100 is a vehicle, examples of the performance curve include various traveling performance curves. When the moving body 100 is a vehicle, the magnitude of the required driving force is decided on the basis of, for example, (i) the content of the instruction of the user 20 and (ii) the driving force diagram of the moving body 100.

For example, a case is considered in which the content of the instruction of the user 20 is to maintain the moving speed of the moving body 100 at 100 km/h. In this case, examples of the instruction of the user 20 include an accelerator operation, an operation regarding cruise control, and the like. The required driving force decision section 324 decides, on the basis of the driving force diagram, the magnitude of the force necessary for maintaining the speed of 100 km/h.

Accordingly, the magnitude of the driving force to be output by the drive unit 140 is decided. As described above, the output of the drive unit 140 is calculated by summing the force for moving the moving body 100 forward by the front wheel drive unit 242 and the force for moving the moving body 100 forward or backward by the rear wheel drive unit 244.

In the present embodiment, the drive control section 328 controls the operation of the drive unit 140. The drive control section 328 controls the operation of the drive unit 140 on the basis of, for example, the magnitude of the required driving force decided by the required driving force decision section 324. The drive control section 328 may control the operation of the drive unit 140 such that the output of the drive unit 140 matches the required driving force decided by the required driving force decision section 324. The drive unit 140 may control the operation of the drive unit 140 by adjusting the output distribution of the front wheel drive unit 242 and the rear wheel drive unit 244.

The drive control section 328 may output, to the drive unit 140, information (may be referred to as a control signal) for controlling the operation of the drive unit 140.

The drive control section 328 may decide the magnitude of the driving force output from the front wheel drive unit 242. The drive control section 328 may control the operation of each section of the front wheel drive unit 242. The drive control section 328 may control a load applied to each section of the front wheel drive unit 242. The drive control section 328 controls, for example, the magnitude of the driving force output by the motor 252 of the front wheel drive unit 242. The drive control section 328 controls, for example, the magnitude of the braking force generated by the brake 262 of the front wheel drive unit 242. Accordingly, the magnitude of the load applied to each of the motor 252, the gear box 254, the shaft 256, and the brake 262 included in the front wheel drive unit 242 is controlled.

The drive control section 328 may decide the magnitude of the driving force or the braking force output from the rear wheel drive unit 244. The drive control section 328 may control the operation of each section of the rear wheel drive unit 244. The drive control section 328 may control the load applied to each section of the rear wheel drive unit 244. The drive control section 328 controls the magnitude of the driving force output from the motor 252 of the rear wheel drive unit 244, for example. For example, the drive control section 328 controls the operation of the gear box 254 of the rear wheel drive unit 244 to control the direction of the driving force output from the motor 252. The drive control section 328 controls, for example, the magnitude of the braking force generated by the brake 262 of the rear wheel drive unit 244. Accordingly, the magnitudes of the loads applied to the motor 252, the gear box 254, and the shaft 256 included in the rear wheel drive unit 244 are controlled.

In the present embodiment, the diagnosis aspect decision section 342 decides an aspect in which the diagnosis section 164 diagnoses a diagnosis target. Examples of the diagnosis aspect include an aspect in which the diagnosis target is diagnosed periodically, an aspect in which the diagnosis target is diagnosed at a random time, an aspect in which the diagnosis target is diagnosed according to a predetermined diagnosis schedule, and the like.

In the present embodiment, the diagnosis time decision section 344 decides a time when the diagnosis section 164 diagnoses the diagnosis target. The diagnosis time decision section 344 decides the time when the diagnosis section 164 diagnoses the diagnosis target, for example, by deciding a diagnosis frequency or diagnosis interval (simply may be referred to as a diagnosis interval). The diagnosis frequency indicates the number of times of diagnosis during a unit period having a predetermined length. The diagnosis interval indicates a time interval between two temporally consecutive diagnoses.

The diagnosis time decision section 344 decides the diagnosis time by deciding the diagnosis interval such that the diagnosis interval differs depending on the time. The diagnosis time decision section 344 may decide the diagnosis interval on the basis of the elapsed period since the production of the moving body 100 and/or the degree of the load applied to the moving body 100 or the diagnosis target. The degree of the load is decided on the basis of, for example, the accumulated value of the load applied to the moving body 100 or the diagnosis target.

The diagnosis time decision section 344 may decide the diagnosis interval for each diagnosis target or may decide the diagnosis interval for each type of diagnosis target. In one embodiment, the diagnosis time decision section 344 refers to a database in which the identification information of a diagnosis target is associated with information indicating a diagnosis interval for each diagnosis time, and decides a diagnosis interval at each time of each diagnosis target. In another embodiment, the diagnosis time decision section 344 refers to a database in which information indicating the type of a diagnosis target is associated with information indicating the diagnosis interval for each diagnosis time, and decides the diagnosis interval for each time of each diagnosis target.

An example of a decision procedure of the diagnosis interval by the diagnosis time decision section 344 will be described by using an embodiment in which a first period and a second period are considered and an embodiment in which a first period, a second period, and a third period are considered. Note that details of the decision procedure of the diagnosis interval by the diagnosis time decision section 344 will also be described in relation to, for example, FIGS. 4, 5, 6, and 7.

Embodiment Considering First Period and Second Period

For example, when the first period and the second period, which are two periods that do not overlap with each other in terms of time, are assumed, the diagnosis time decision section 344 decides the diagnosis time such that the length of the time interval of diagnosis in the first period is equal to or less than a first reference value and the length of the time interval of diagnosis in the second period is larger than the first reference value. When the diagnosis aspect decision section 342 decides to operate the diagnosis section 164 in an aspect of periodically diagnosing the diagnosis target, the diagnosis time decision section 344 may decide the diagnosis time such that the length of the time interval of the periodic diagnosis in the first period is equal to or less than the first reference value and the length of the time interval of the periodic diagnosis in the second period is larger than the first reference value.

According to the present embodiment, the diagnosis interval in the second period is longer than the diagnosis interval in the first period, and the diagnosis frequency in the second period is smaller than the diagnosis frequency in the first period. Accordingly, the number of times of diagnosis executed during the first period and the second period can be reduced. As a result, the power consumed by the diagnosis of the moving body 100 is reduced. In addition, deterioration of a computer mounted on the moving body 100 is suppressed.

(Diagnosis Interval in First Period)

In one embodiment, when the length of the elapsed period since a time point at which the moving body 100 is produced or a time point at which the moving body is transferred to the end-user of the equipment (may be referred to as a first time point) is smaller than a predetermined value (may be referred to as a first threshold value), the diagnosis time decision section 344 may decide the diagnosis time on the basis of the length of the time interval (may be referred to as a first time interval) in the first period. In this case, for example, the diagnosis time decision section 344 decides to execute a (n+1)-th diagnosis when the first time interval has elapsed since a n-th diagnosis is executed. n may be an integer of 0 or 1 or more.

The (n+1)-th diagnosis may not be executed immediately after the diagnosis time decision section 344 decides to execute the (n+1)-th diagnosis. For example, there is a case where even when the diagnosis time decision section 344 decides to execute the (n+1)-th diagnosis, the diagnosis of the moving body 100 cannot be executed depending on the use situation of the moving body 100.

The diagnosis time decision section 344 may decide, as the length of the first time interval, a predetermined value or a value designated by the user. The diagnosis time decision section 344 may decide the length of the first time interval on the basis of the length of the elapsed period since the first time point. The diagnosis time decision section 344 may decide the length of the first time interval such that the length of the first time interval increases as the length of the elapsed period since the first time point increases.

The diagnosis time decision section 344 may decide the length of the first time interval with reference to the diagnosis interval storage section 362. For example, when the diagnosis interval storage section 362 contains the condition regarding the length of the elapsed period since the first time point and the diagnosis interval in a case where the condition is satisfied in association with each other, the diagnosis time decision section 344 calculates the length of the elapsed period since the first time point at the current time point, and refers to the diagnosis interval storage section 362 to acquire information indicating the diagnosis interval corresponding to the length of the elapsed period. For example, when the diagnosis interval storage section 362 contains the condition regarding the degree of the load applied to the diagnosis target from the first time point and the diagnosis interval in a case where the condition is satisfied in association with each other, the diagnosis time decision section 344 calculates the degree of load at the current time point, and refers to the diagnosis interval storage section 362 to acquire information indicating the diagnosis interval corresponding to the degree of load.

The first period may be a period from the first time point to a time point (may be referred to as a second time point) at which the length of the elapsed period since the first time point becomes the first threshold value. The second period may be a period from a time point at which the second time point is exceeded to a time point (may be referred to as a third time point) at which the degree of the load applied to the diagnosis target during the elapsed period since the first time point reaches a predetermined degree.

(Diagnosis Interval in Second Period)

In another embodiment, when the length of the elapsed period since the first time point is larger than the first threshold value and the degree of the load applied to the diagnosis target during the elapsed period since the first time point is smaller than a predetermined first degree, the diagnosis time decision section 344 may decide the time on the basis of the length of the time interval (may be referred to as a second time interval) in the second period. According to the present embodiment, the commencement of the second period is, for example, a time point at which the length of the elapsed period since the first time point exceeds the first threshold value, and the end of the second period is, for example, a time point at which the degree of the load applied to the diagnosis target during the elapsed period since the first time point reaches the first degree. Note that the commencement of the second period may be a time point at which the length of the elapsed period since the first time point reaches the first threshold value, and the end of the second period may be a time point at which the degree of the load applied to the diagnosis target during the elapsed period since the first time point exceeds the first degree.

In this case, for example, the diagnosis time decision section 344 decides to execute the (n+1)-th diagnosis when the second time interval elapses since the n-th diagnosis is executed. As described above, the (n+1)-th diagnosis may not be executed immediately after the diagnosis time decision section 344 decides to execute the (n+1)-th diagnosis.

The diagnosis time decision section 344 may decide, as the length of the second time interval, a predetermined value or a value designated by the user. The diagnosis time decision section 344 may decide the length of the second time interval on the basis of the degree of the load applied to the diagnosis target during the elapsed period since the first time point. The diagnosis time decision section 344 may decide the length of the second time interval such that the length of the second time interval decreases as the degree of the load applied to the diagnosis target during the elapsed period since the first time point increases.

The diagnosis time decision section 344 may decide the length of the second time interval with reference to the diagnosis interval storage section 362. For example, when the diagnosis interval storage section 362 contains the condition regarding the length of the elapsed period since the first time point and the diagnosis interval in a case where the condition is satisfied in association with each other, the diagnosis time decision section 344 calculates the length of the elapsed period since the first time point at the current time point, and refers to the diagnosis interval storage section 362 to acquire information indicating the diagnosis interval corresponding to the length of the elapsed period. For example, when the diagnosis interval storage section 362 contains the condition regarding the degree of the load applied to the diagnosis target from the first time point and the diagnosis interval in a case where the condition is satisfied in association with each other, the diagnosis time decision section 344 calculates the degree of load at the current time point, and refers to the diagnosis interval storage section 362 to acquire information indicating the diagnosis interval corresponding to the degree of load.

Embodiment Considering First Period, Second Period, and Third Period

For example, when the first period, the second period, and the third period, which are three periods that do not overlap with each other in terms of time, are assumed, the diagnosis time decision section 344 decides the diagnosis time such that the length of the time interval of diagnosis in the first period is equal to or less than the first reference value and the length of the time interval of diagnosis in the second period is larger than the first reference value. The diagnosis time decision section 344 decides the diagnosis time such that the length of the time interval of diagnosis in the third period is equal to or less than a second reference value and the length of the time interval of diagnosis in the second period is larger than the second reference value. For example, when the diagnosis aspect decision section 342 decides to operate the diagnosis section 164 in an aspect of periodically diagnosing the diagnosis target, the diagnosis time decision section 344 may decide the diagnosis time by the above procedure.

The first reference value and the second reference value may be the same or different. The first reference value may be larger than the second reference value or smaller than the second reference value. The absolute value of the difference between the first reference value and the second reference value may be less than 24 hours. The second period may start after the first period ends. The third period may start after the second period ends.

According to the present embodiment, the diagnosis interval in the second period is longer than the diagnosis interval in the first period, and the diagnosis frequency in the second period is smaller than the diagnosis frequency in the first period. On the other hand, the diagnosis interval in the third period is shorter than the diagnosis interval in the second period, and the diagnosis frequency in the third period is than the diagnosis frequency in the second period. Accordingly, the accuracy of diagnosis in the first period and the third period is improved. In addition, as described above, the number of times of diagnosis executed during the second period can be reduced.

For example, in a period (for example, the first period) until a predetermined time elapses since the moving body 100 is produced, a failure caused by an initial defect of a component is likely to occur. On the other hand, when the above period elapses, the failure caused by the initial defect of the component hardly occurs. Thereafter, when deterioration, wear, or the like of the component progresses to a certain degree or more, the failure caused by the deterioration, wear, or the like of the component is likely to occur.

Therefore, by reducing the diagnosis interval in the first period, the diagnosis section 164 can detect a sign of the failure caused by the initial defect of the component. In addition, by increasing the diagnosis interval in the second period after the first period has elapsed, the diagnosis section 164 can suppress an increase in power consumption associated with diagnosis, deterioration of a computer, and the like. Furthermore, by reducing the diagnosis interval in the third period, the diagnosis section 164 can detect the sign of the failure caused by the deterioration, wear, or the like of the component.

In the present embodiment, the start determination section 346 decides whether to execute diagnosis processing. As described above, examples of the diagnosis target of the diagnosis processing include the drive unit 140 or a component part of the drive unit 140. In addition, in the diagnosis processing, the state of the diagnosis target is diagnosed.

The start determination section 346 decides to execute the diagnosis processing when the state of the moving body 100 meets a predetermined condition (may be referred to as a diagnosis start condition). The start determination section 346 may decide to execute the diagnosis processing when the diagnosis time has come and the state of the moving body 100 meets the diagnosis start condition.

Examples of the state of the moving body 100 include a moving state of the moving body 100. Examples of the moving state of the moving body 100 include the degree of stability of the moving body 100, the degree of stability of the rotation speed of a rotating component included in the moving body 100, and the like. Examples of the rotating component include the drive unit 140, a component part of the drive unit 140, and the like.

Examples of the diagnosis start condition include at least one of a condition that an aspect of the operation of the moving body by the end-user of the moving body meets a predetermined condition (may be referred to as an operation condition), a condition that a degree of acceleration of the moving body is smaller than a predetermined degree, and a condition that a degree of turning of the moving body is smaller than a predetermined degree. When the rotation speed of the rotating component included in the moving body 100 is relatively stable, these conditions can be satisfied.

Other examples of the diagnosis start condition include at least one of a condition that a steering amount by the user 20 is smaller than a predetermined value, a condition that a brake operation is not performed, a condition that a brake operation amount is smaller than a predetermined value, a condition that the state of a road surface meets a predetermined condition (may be referred to as a road surface condition), and a condition that a system for automatically stabilizing the behavior of the moving body 100 is not operating. When the state of the moving body 100 is relatively stable, these conditions can be satisfied.

Examples of the road surface condition include a condition that the magnitude of frictional force acting on the contact surface between the tire and the road surface or the magnitude of a friction coefficient of the friction is larger than a predetermined value. Examples of the system for automatically stabilizing the behavior of the moving body 100 include safety apparatuses such as an anti-lock brake system (ABS), a traction control system (TCS), and a sideslip suppression apparatus, a system that comprehensively controls these safety apparatuses, and the like.

In the present embodiment, the diagnosis processing execution section 348 executes diagnosis processing, for example. The diagnosis processing execution section 348 may start diagnosis of the diagnosis target when the start determination section 346 decides to execute the diagnosis processing. Examples of the diagnosis target of the diagnosis processing include the drive unit 140 or a component part of the drive unit 140. In addition, in the diagnosis processing, the state of the diagnosis target is diagnosed.

In the present embodiment, the diagnosis interval storage section 362 contains a condition regarding the period and a diagnosis interval at the period in association with each other. In one embodiment, the diagnosis interval storage section 362 contains a condition regarding the length of the elapsed period since the first time point and a diagnosis interval when the condition is satisfied in association with each other. In another embodiment, the diagnosis interval storage section 362 contains a condition regarding the degree of the load applied to the diagnosis target from the first time point and a diagnosis interval when the condition is satisfied in association with each other. In still another embodiment, the diagnosis interval storage section 362 contains a combination of the condition regarding the length of the elapsed period since the first time point and the condition regarding the degree of the load applied to the diagnosis target from the first time point and a diagnosis interval when the combination of the conditions is satisfied in association with each other.

In the present embodiment, the normal value storage section 366 contains, for each of the one or more rotating components included in the moving body 100, information indicating a value (may be referred to as a normal value, a vibration level in a normal state, or the like) of a vibration level of each of one or more frequency components in a case where the state of each rotating component and the state of the rotating shaft coupled with each rotating component are normal (may be referred to as the normal state). The normal value storage section 366 may contain, in association with each other, identification information for identifying each of one or more rotating components, information indicating resolution when a vibration waveform of each rotating component in the normal state is decomposed into a plurality of frequency components, and information indicating a vibration level, in the normal state, of each of one or more frequency components used to detect an abnormality of each rotating component among the plurality of frequency components.

A plurality of rotating components coupled to a single rotating shaft rotate at the same rotation frequency. In this regard, the normal value storage section 366 may contain information indicating the vibration level, in the normal state, of each of one or more frequency components for each group, with the plurality of rotating components coupled to a single rotating shaft as one group.

For example, the normal value storage section 366 contains the identification information of each group and the identification information of each of the plurality of rotating components included in each group in association with each other. For example, the normal value storage section 366 contains, in association with each other, the identification information of each group and the information indicating the vibration level, in the normal state, of each of one or more frequency components used for detecting abnormality of the rotating component included in each group. The normal value storage section 366 may contain, in association with each other, the identification information of each group, the information indicating the resolution when the vibration waveform in the normal state of the rotating component included in each group is decomposed into a plurality of frequency components, and the information indicating the vibration level, in the normal state, of each of one or more frequency components used to detect the abnormality of the rotating component included in each group.

Each of the rotating components is coupled to the rotating shaft and rotates by force transmitted from the rotating shaft. Examples of the rotating component include a bearing, a gear, a chain, a belt, and the like.

(Specific Configuration of Each Section of Control Unit 160)

each section of the control unit 160 may be implemented by hardware, software, or hardware and software. At least a part of each section of the control unit 160 may be realized by a single server or may be realized by a plurality of servers. At least a part of each section of the control unit 160 may be realized on virtual equipment or a cloud system. At least a part of each section of the control unit 160 may be realized by a personal computer or a mobile terminal. Examples of the mobile terminal can include a mobile phone, a smartphone, a PDA, a tablet, a notebook computer or a laptop computer, a wearable computer, and the like. Each section of the control unit 160 may contain information by using a distributed ledger technology such as a block chain or a distributed network.

When at least a part of constituents constituting the control unit 160 is realized by software, the constituents realized by the software may be realized by starting software or a program that defines an operation regarding the constituents in an information processing apparatus having a general configuration. The above-described information processing apparatus with a general configuration may comprise (i) a data processing apparatus having a processor such as a CPU or a GPU, or a ROM, a RAM, a communication interface and the like, (ii) an input apparatus such as a keyboard, a pointing device, a touch panel, a camera, a voice/sound input apparatus, a gesture input apparatus, various kinds of sensors, a GPS receiver, and (iii) an output apparatus such as a display apparatus, a voice/sound output apparatus, a vibration apparatus, and (iv) a storage apparatus (including an external storage apparatus) such as a memory, HDD, SSD and the like.

In the above-described information processing apparatus of common configuration, the above-described data processing apparatus or storage apparatus may store the above-described software or program. By being executed by a processor, the software or program described above causes the information processing apparatus described above to execute operations specified by the software or the program. The software or program described above may be contained in a non-transitory computer-readable recording medium. The software or program described above may be a program for causing a computer to function as the control unit 160 or a part thereof. The software or program described above may be a program for causing a computer to execute an information processing method in the control unit 160 or a part thereof.

The above-described information processing method may be a diagnostic method for diagnosing a state of equipment including a rotating component that rotates by force transmitted from a rotating shaft. The above-described diagnostic method includes, for example, acquiring vibration information including waveform information of vibration of a rotating component. The above-described diagnostic method includes, for example, analyzing by decomposing a vibration waveform into a plurality of frequency components and outputting values of a plurality of vibration levels indicating degrees of vibration for each of the frequency components. The above-described diagnostic method includes, for example, determining a presence or absence of an abnormality in at least one of the rotating shaft and the rotating component on the basis of the values of the plurality of vibration levels output in the analyzing.

According to one embodiment, in the above-described diagnostic method, the determining includes, for example, performing comparison of a value of a vibration level for each frequency component with a normal value of the vibration level for each frequency component for each of one or more frequency components included in a range from a first frequency, which is a frequency smaller than a rotation frequency of a rotating shaft, to the rotation frequency. The determining includes, for example, determining the presence or absence of an abnormality in at least one of the rotating shaft and the rotating component on the basis of a result of the comparison.

According to another embodiment, in the above diagnostic method, the determining includes, for example, calculating a total value by adding values of respective vibration levels of one or more frequency components included in a range from a first frequency, which is a frequency smaller than a rotation frequency of the rotating shaft, to the rotation frequency. The determining includes, for example, determining whether a relationship between the calculated total value and a normal value of the total value meets a predetermined condition. The determining includes, for example, determining that an abnormality has occurred in at least one of the rotating shaft and the rotating component when it is determined that the relationship between the total value and the normal value of the total value does not meet the predetermined condition.

The above-described information processing method may be executed by a computer. A program for causing a computer to execute the above-described information processing method may be provided. The above-described program may be contained in a computer readable storage medium.

The diagnosis section 164 may be an example of a necessity decision section. The diagnosis aspect decision section 342 may be an example of an aspect decision section. The diagnosis time decision section 344 may be an example of a time decision section. The start determination section 346 may be an example of the necessity decision section. The diagnosis processing execution section 348 may be an example of a diagnosis section. A component to be diagnosed may be an example of equipment.

One Example of Another Embodiment

In the present embodiment, the details of the diagnosis time decision section 344 have been described by using, as an example, a case where the commencement of the second period is a time point at which the length of the elapsed period since the first time point exceeds the first threshold value, and the end of the second period is a time point at which the degree of the load applied to the diagnosis target during the elapsed period since the first time point reaches the first degree. However, the diagnosis time decision section 344 is not limited to the present embodiment.

In another embodiment, the commencement of the second period may be a time point at which the length of the elapsed period since the first time point exceeds the first threshold value, and the end of the second period may be a time point at which the length of the elapsed period since the first time point reaches a predetermined second threshold value. According to the above embodiment, when the length of the elapsed period from the first time point is larger than the first threshold value and smaller than the predetermined second threshold value, the diagnosis time decision section 344 decides the diagnosis time on the basis of the length of the time interval (may be referred to as the second time interval) in the second period.

In still another embodiment, when the degree of the load applied to the equipment during the elapsed period since the first time point is smaller than the predetermined first degree, the diagnosis time decision section 344 may decide the diagnosis time on the basis of the length of the second time interval which is the time interval in the second period. In still another embodiment, when the degree of the load applied to the equipment during the elapsed period since the first time point is (a) larger than the first degree or (b) smaller than a predetermined second degree, the diagnosis time decision section 344 may decide the diagnosis time on the basis of the length of the first time interval that is the time interval in the first period. In this case, the second degree may indicate that the degree of load is smaller than the first degree.

In the present embodiment, the details of the control unit 160 have been described by using, as an example, a case where the start determination section 346 is included in the diagnosis section 164. However, the control unit 160 is not limited to the present embodiment. In another embodiment, the start determination section 346 may be included in the control section 162. In this case, the control section 162 may be an example of the control apparatus.

In the present embodiment, the details of the information processing in the control unit 160 have been described by using, as an example, a case where the diagnosis section 164 diagnoses the state of the front wheel drive unit 242 or a part of the components constituting the front wheel drive unit 242. However, the control unit 160 is not limited to the present embodiment. In another embodiment, the control unit 160 may diagnose the state of another component constituting the moving body 100.

Figure 4:
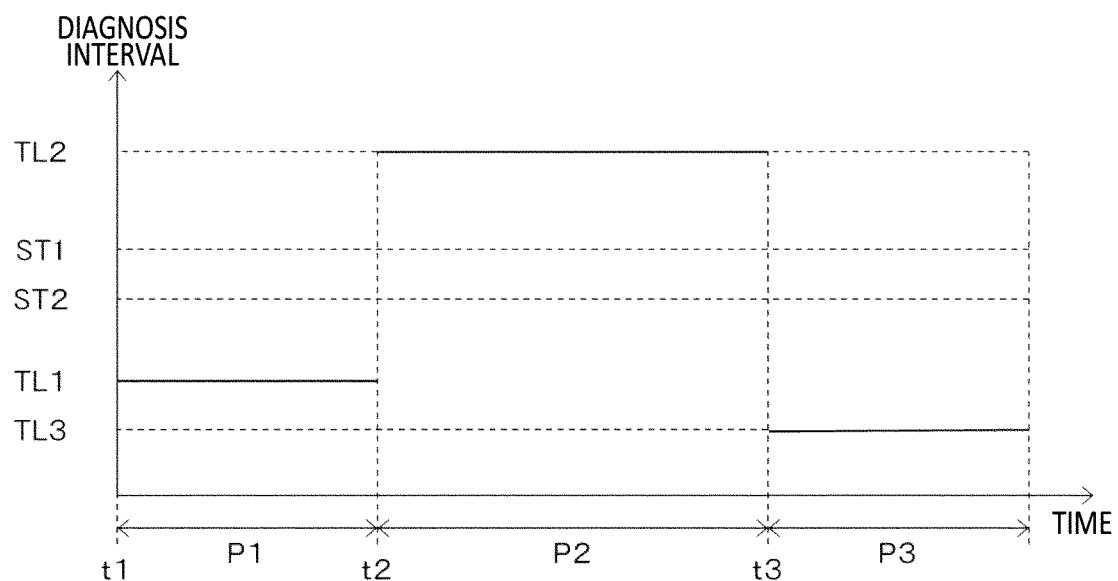
FIG. 4 schematically illustrates an example of information processing in a diagnosis time decision section 344.

FIG. 4 schematically illustrates an example of the information processing in the diagnosis time decision section 344. In FIG. 4, t1 represents an example of the above-described first time point. t2 represents an example of the above-described second time point. t3 represents an example of the above-described third time point.

As described above, t1 indicates (i) a time point at which the moving body 100 is produced or (ii) a time point at which the moving body 100 is transferred from a producer to the user 20. t2 may be (i) a time point at which the length of the elapsed period since the first time point reaches the first threshold value, or (ii) a time point at which the degree of the load applied to the moving body 100 or the diagnosis target during the elapsed period since the first time point reaches the second degree. t3 may be (i) a time point at which the degree of the load applied to the moving body 100 or the diagnosis target during the elapsed period since the first time point reaches the first degree, or (ii) a time point at which the length of the elapsed period since the first time point reaches the second threshold value.

For example, the first degree indicates that the accumulated load amount is larger than the second degree. For example, the second threshold value is larger than the first threshold value.

As described above, t2 may be a time point in time when the length of the elapsed period since the first time point reaches the first threshold value. Accordingly, the diagnosis section 164 can detect the sign of the failure caused by the initial defect of the component. t3 may be a time point at which the degree of the load applied to the moving body 100 or the diagnosis target during the elapsed period since the first time point reaches the first degree. Accordingly, the diagnosis section 164 can detect the sign of the failure caused by the deterioration, wear, or the like of the component.

Similarly, a period P1 represents an example of the above-described first period. A period P2 represents an example of the above-described second period. A time P3 represents an example of the above-described third period.

In FIG. 4, the details of the method for deciding the diagnosis time in the diagnosis time decision section 344 will be described by using, as an example, a case where the commencement of the period P2 is after the end of the period P1 and the commencement of the period P3 is after the end of the period P2. As described above, the diagnosis time decision section 344 decides the (n+1)-th diagnosis time by deciding the time interval until the (n+1)-th diagnosis is executed since the n-th diagnosis is executed.

As described above, the timing at which the diagnosis processing execution section 348 starts the diagnosis processing is decided by the start determination section 346. Therefore, the actual diagnosis interval may be longer than TL1 depending on the state of the moving body 100.

As illustrated in FIG. 4, according to the present embodiment, for example, the diagnosis time decision section 344 decides the diagnosis time such that the diagnosis interval becomes TL1 in the period P1. For example, the diagnosis time decision section 344 decides the diagnosis time such that the diagnosis interval becomes TL2 in the period P2. For example, the diagnosis time decision section 344 decides the diagnosis time such that the diagnosis interval becomes TL3 in the period P3.

As illustrated in FIG. 4, TL2 is a value larger than ST1, and TL1 is a value smaller than ST1. The diagnosis time decision section 344 may decide TL1 such that TL1 becomes smaller than ST1. The diagnosis time decision section 344 may decide TL2 such that TL2 becomes larger than ST1.

At least one of TL1 and TL2 may be a predetermined value. At least one of TL1 and TL2 may be decided on the basis of the length of the elapsed period since t1. At least one of TL1 and TL2 may be decided on the basis of the degree of the load applied to the diagnosis target during the elapsed period since t1.

As illustrated in FIG. 4, TL2 is a value larger than ST2, and TL3 is a value smaller than ST2. The diagnosis time decision section 344 may decide TL2 such that TL2 becomes larger than ST2. The diagnosis time decision section 344 may decide TL3 such that TL3 becomes smaller than ST2.

As described above, at least one of TL2 and TL3 may be a predetermined value. At least one of TL2 and TL3 may be decided on the basis of the length of the elapsed period since t1. At least one of TL2 and TL3 may be decided on the basis of the degree of the load applied to the diagnosis target during the elapsed period since t1.

TL1 may be an example of one of the first time interval and the first time interval. TL2 may be another example of the first time interval and the first time interval. TL1 may be an example of the first time interval. TL2 may be an example of the second time interval. TL3 may be an example of the third time interval. ST1 may be an example of the first reference value. ST2 may be an example of the second reference value.

One Example of Another Embodiment

In the present embodiment, an example of the information processing in the diagnosis time decision section 344 has been described by using, as an example, a case where ST1 is larger than ST2. Specifically, an example of the decision processing of the diagnosis interval has been decided. However, the information processing in the diagnosis time decision section 344 is not limited to the present embodiment. In another embodiment, ST1 and ST2 may be equal, and ST1 may be smaller than ST2.

In the present embodiment, an example of the information processing in the diagnosis time decision section 344 has been described by using, as an example, a case where TL1 is larger than TL3. Specifically, an example of the decision processing of the diagnosis interval has been decided. However, the information processing in the diagnosis time decision section 344 is not limited to the present embodiment. In another embodiment, TL1 and TL3 may be equal, and TL1 may be smaller than TL3.

In the present embodiment, an example of the information processing in the diagnosis time decision section 344 has been described by using, as an example, a case where the diagnosis interval in the first period is constant. Specifically, an example of the decision processing of the diagnosis interval has been decided. However, the information processing in the diagnosis time decision section 344 is not limited to the present embodiment. In another embodiment, the diagnosis interval may be different at a plurality of time points included in the first period. The diagnosis interval in the first period may continuously change according to time, or may change stepwise according to time.

In the present embodiment, an example of the information processing in the diagnosis time decision section 344 has been described by using, as an example, a case where the diagnosis interval in the second period is constant. Specifically, an example of the decision processing of the diagnosis interval has been decided. However, the information processing in the diagnosis time decision section 344 is not limited to the present embodiment. In another embodiment, the diagnosis interval may be different at a plurality of time points included in the second period. The diagnosis interval in the second period may continuously change according to time, or may change stepwise according to time.

In the present embodiment, an example of the information processing in the diagnosis time decision section 344 has been described by using, as an example, a case where the diagnosis interval in the third period is constant. Specifically, an example of the decision processing of the diagnosis interval has been decided. However, the information processing in the diagnosis time decision section 344 is not limited to the present embodiment. In another embodiment, the diagnosis interval may be different at a plurality of time points included in the third period. The diagnosis interval in the third period may continuously change according to time, or may change stepwise according to time.

Figure 5:
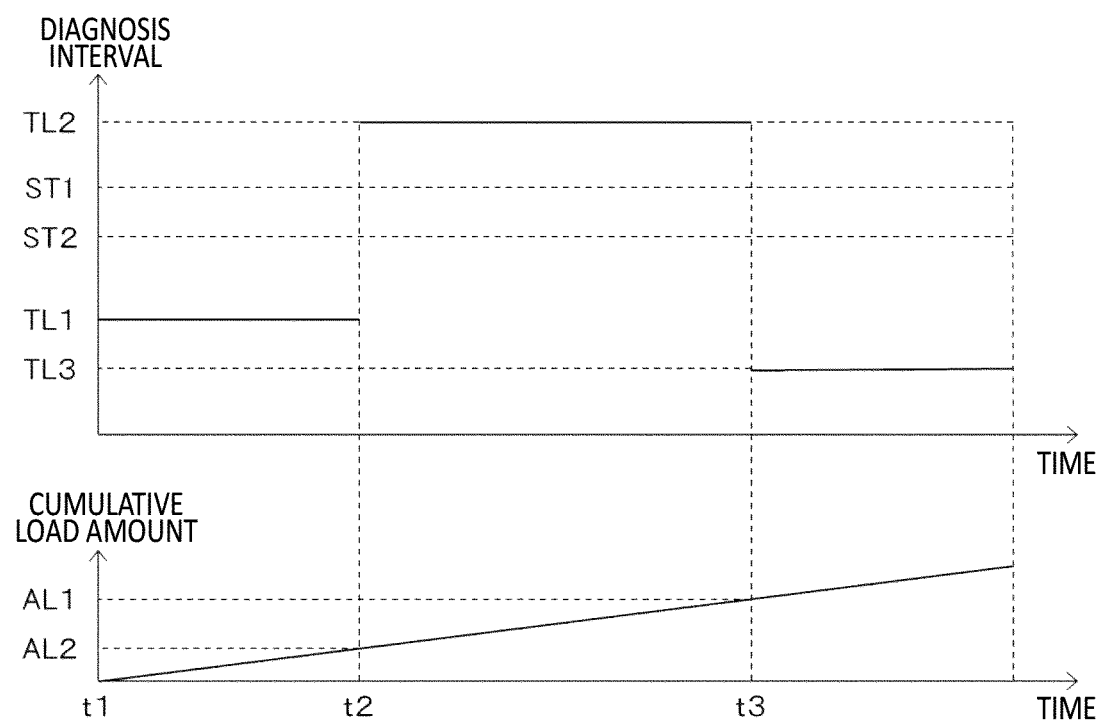
FIG. 5 schematically illustrates another example of the information processing in the diagnosis time decision section 344.

FIG. 5 schematically illustrates another example of the information processing in the diagnosis time decision section 344. With reference to FIG. 5, an embodiment will be described in which both the end of the period P1 and the end of the period P2 are decided on the basis of the degree of the load applied to the diagnosis target during the elapsed period since t1. According to the present embodiment, the period P1 ends and the period P2 starts at the time point at which the accumulated amount of the load applied to the diagnosis target during the elapsed period since t1 becomes AL2. Similarly, the period P2 ends and the period P3 starts at the time point at which the accumulated amount of the load applied to the diagnosis target during the elapsed period since t1 becomes AL1.

AL1 may be an example of the first degree. AL2 may be an example of the second degree.

Figure 6:
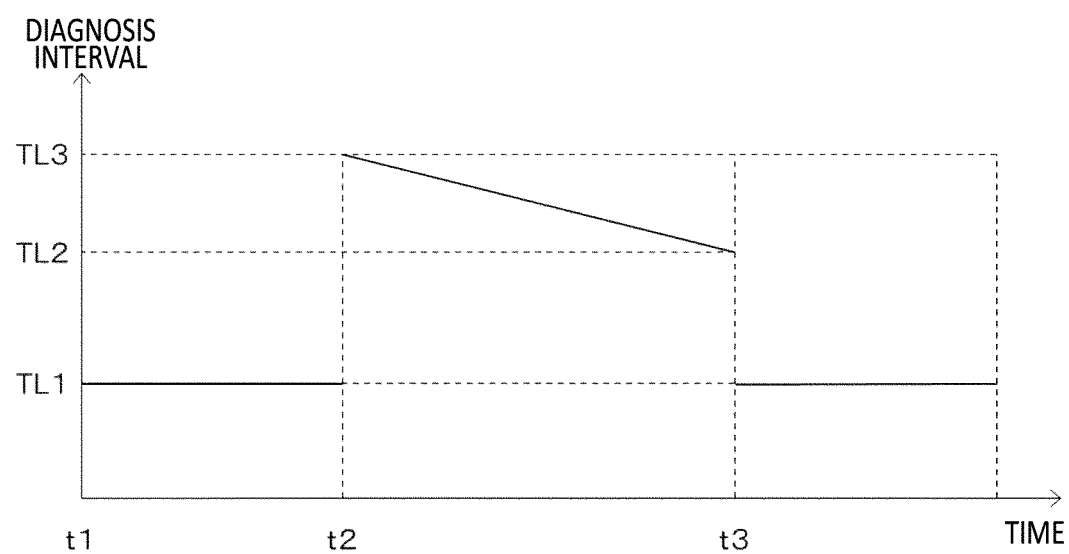
FIG. 6 schematically illustrates another example of the information processing in the diagnosis time decision section 344.

FIG. 6 schematically illustrates another example of the information processing in the diagnosis time decision section 344. The embodiment described in relation to FIG. 6 differs from the embodiment described in relation to FIG. 4 in that the diagnosis interval in the period P2 is expressed as a function of the elapsed period since t1 and/or the degree of the load applied to the diagnosis target during the elapsed period since t1. The embodiment described in relation to FIG. 6 differs from the embodiment described in relation to FIG. 4 in that the diagnosis interval in the period P1 is equal to the diagnosis interval in the period P3. The embodiment described in relation to FIG. 6 may have similar features to the embodiment described in relation to FIG. 4, except for the above differences.

In the present embodiment, the diagnosis time decision section 344 decides the diagnosis interval in the period P2 such that (i) the diagnosis interval in the commencement t2 of the period P2 becomes TL3, (ii) the diagnosis interval in the end t3 of the period P2 becomes TL2, and (iii) as the elapsed period since t1 and/or the degree of the load applied to the diagnosis target during the elapsed period since t1 increases, the diagnosis interval decreases. According to the present embodiment, the diagnosis interval in the period P2 is decided by using a function that continuously changes according to the elapsed period since t1 and/or the degree of the load applied to the diagnosis target during the elapsed period since t1. Note that the above-described function used to decide the diagnosis interval is not limited to the present embodiment.

Figure 7:
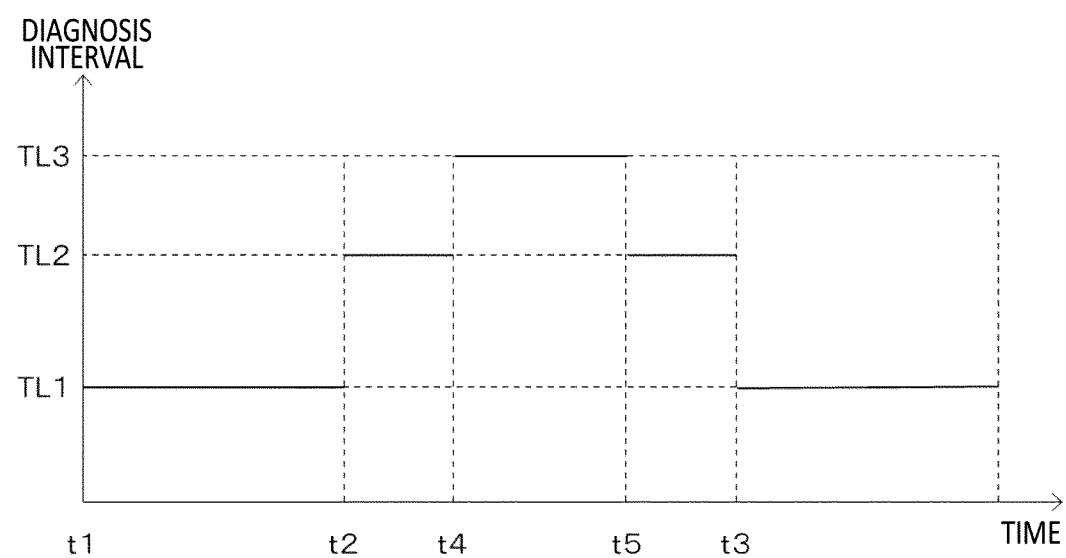
FIG. 7 schematically illustrates another example of the information processing in the diagnosis time decision section 344.

FIG. 7 schematically illustrates another example of the information processing in the diagnosis time decision section 344. The embodiment described in relation to FIG. 7 differs from the embodiment described in relation to FIG. 6 in that the diagnosis interval in the period P2 is expressed as a function that changes stepwise according to the elapsed period since t1 and/or the degree of the load applied to the diagnosis target during the elapsed period since t1.

According to the present embodiment, the diagnosis time decision section 344 decides the diagnosis time such that the diagnosis interval becomes TL2 in the period from t2 to t4, for example. For example, the diagnosis time decision section 344 decides the diagnosis time such that the diagnosis interval becomes TL3 in the period from t4 to t5. For example, the diagnosis time decision section 344 decides the diagnosis time such that the diagnosis interval becomes TL2 in the period from t5 to t3. TL3 may be a value larger than TL2.

Figure 8:
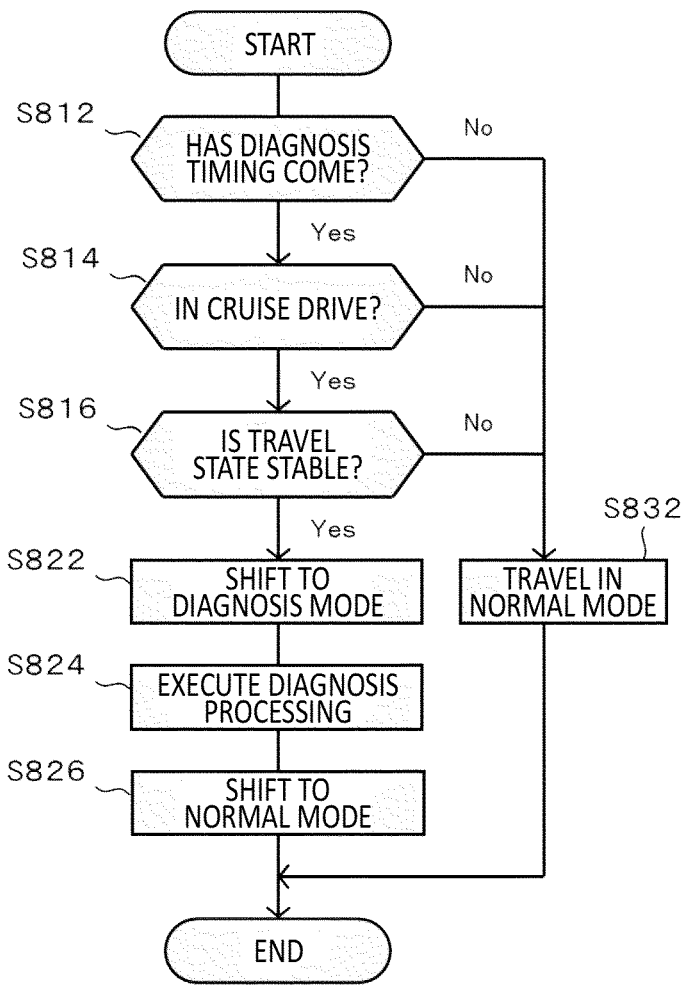
FIG. 8 schematically illustrates an example of information processing in a start determination section 346.

FIG. 8 schematically illustrates an example of information processing in the start determination section 346. According to the present embodiment, first, in step 812 (step may be abbreviated to S), it is determined whether the diagnosis time for the diagnosis target has come. For example, on the basis of the diagnosis interval decided by the diagnosis time decision section 344 and the time when the previous diagnosis is executed, the start determination section 346 determines whether the diagnosis time of the diagnosis target has come.

More specifically, the start determination section 346 calculates the length of the elapsed period since the time when the previous diagnosis was executed. When the calculated length of the elapsed period is larger than the value of the diagnosis interval decided by the diagnosis time decision section 344, the start determination section 346 determines that the diagnosis time of the diagnosis target has come.

When it is determined that the diagnosis time of the diagnosis target has not come (No in S812), the diagnosis processing is not executed. In this case, in S832, the moving body 100 travels in a normal mode. For example, the drive control section 328 controls the front wheel drive unit 242 and the rear wheel drive unit 244 such that the sum of the absolute value of the output generated by the front wheel drive unit 242 and the absolute value of the output generated by the rear wheel drive unit 244 becomes the output of the drive unit 140. Accordingly, the drive control section 328 can control the operation of the drive unit 140 such that the magnitude of the driving force output from the drive unit 140 matches the magnitude of the required driving force.

On the other hand, when it is determined that the diagnosis time of the diagnosis target has come (Yes in S812), it is determined in S814 whether the degree of fluctuation of the traveling speed of the moving body 100 is smaller than a predetermined degree. A traveling state in which the degree of fluctuation of the traveling speed of the moving body 100 is smaller than the predetermined degree may be referred to as cruise travel, cruise driving, or the like. In addition, controlling the moving body 100 such that the degree of fluctuation of the traveling speed of the moving body 100 becomes smaller than the predetermined degree may be referred to as cruise control.

The start determination section 346 determines whether the moving body 100 is cruise-driving by determining, for example, at least one of (i) whether the opening degree of an accelerator pedal is larger than a predetermined value, (ii) whether the fluctuation amount of the opening degree of the accelerator pedal in a predetermined period is smaller than a predetermined value, (iii) whether the actual acceleration of the moving body 100 is smaller than a predetermined value, and (iv) whether the turning acceleration of the moving body 100 is smaller than a predetermined value. For example, when (i) the opening degree of the accelerator pedal is larger than the predetermined value, (ii) the fluctuation amount of the opening degree of the accelerator pedal in the predetermined period is smaller than the predetermined value, (iii) the actual acceleration of the moving body 100 is smaller than the predetermined value, and (iv) the turning acceleration of the moving body 100 is smaller than the predetermined value, the start determination section 346 determines that the moving body 100 is cruise-driving.

When it is determined that the moving body 100 is not cruise-driving (No in S814), the diagnosis processing is not executed. In this case, in S832, the moving body 100 travels in the normal mode.

On the other hand, when it is determined that the moving body 100 is cruise-driving (Yes in S814), it is determined in S816 whether the traveling state of the moving body 100 is stable. The diagnosis processing may be executed while the moving body 100 is traveling or may be executed while the moving body 100 is stopped. For example, when the diagnosis target is the drive unit 140 or a component part of the drive unit 140, the diagnosis processing is executed while the moving body 100 is traveling.

For example, the start determination section 346 determines whether the traveling state of the moving body 100 is stable by determining at least one of (i) whether a steering wheel operation amount is smaller than a predetermined value, (ii) whether a brake operation is performed or whether a brake operation amount is smaller than a predetermined value, (iii) whether the state of the road surface meets the above-described road surface condition, and (iv) whether a system for automatically stabilizing the behavior of the moving body 100 is operating. For example, when (i) the steering wheel operation amount is smaller than the predetermined value, (ii) the brake operation is not performed or the brake operation amount is smaller than the predetermined value, (iii) the magnitude of the frictional force acting on the contact surface between the tire and the road surface or the magnitude of the friction coefficient of the friction is larger than the predetermined value, and (iv) the system for automatically stabilizing the behavior of the moving body 100 is not operating, the start determination section 346 determines that the traveling state of the moving body 100 is stable.

When it is determined that the traveling state of the moving body 100 is not stable (No in S816), the diagnosis processing is not executed. In this case, in S832, the moving body 100 travels in the normal mode.

On the other hand, when it is determined that the traveling state of the moving body 100 is stable (Yes in S816), the operation mode of the moving body 100 shifts from the normal mode to a diagnosis mode in S822. For example, the drive control section 328 adjusts the output distribution of the front wheel drive unit 242 and the rear wheel drive unit 244. Accordingly, the operation mode of the moving body 100 shifts from the normal mode to the diagnosis mode, and the moving body 100 travels in the diagnosis mode.

In one embodiment, the drive control section 328 controls the front wheel drive unit 242 such that the absolute value of the output generated by the front wheel drive unit 242 becomes diagnosis driving force. The drive control section 328 controls the front wheel drive unit 242 and the rear wheel drive unit 244 such that a value obtained by subtracting the absolute value of the output or the braking force generated by the rear wheel drive unit 244 from the absolute value of the output generated by the front wheel drive unit 242 becomes the required driving force. Accordingly, the drive control section 328 can control the operation of the drive unit 140 such that the magnitude of the driving force output from the drive unit 140 matches the magnitude of the required driving force.

For example, when the required driving force for cruise-driving the moving body 100 at a specific speed is 500 N, in the normal mode, the drive control section 328 controls the operations of the front wheel drive unit 242 and the rear wheel drive unit 244 such that the brake 262 of the front wheel drive unit 242 is turned off, the front wheel drive unit 242 outputs driving force of 500 N, and the driving force or the braking force of the rear wheel drive unit 244 becomes substantially 0 N. On the other hand, in the diagnosis mode, the drive control section 328 controls the operations of the front wheel drive unit 242 and the rear wheel drive unit 244 such that the brake 262 of the front wheel drive unit 242 is turned off, the front wheel drive unit 242 outputs driving force of 700 N, and the rear wheel drive unit 244 outputs braking force of 200 N. The motor 252 of the rear wheel drive unit 244 may generate the braking force of the rear wheel drive unit 244, the brake 262 of the rear wheel drive unit 244 may generate the braking force of the rear wheel drive unit 244, and the motor 252 and the brake 262 of the rear wheel drive unit 244 may generate the braking force of the rear wheel drive unit 244.

In another embodiment, the drive control section 328 controls the front wheel drive unit 242 such that the absolute value of the output generated by the motor 252 of the front wheel drive unit 242 becomes the diagnosis driving force. The drive control section 328 controls the front wheel drive unit 242 and the rear wheel drive unit 244 such that a value, which is obtained by subtracting (ii) the sum of the absolute value of the braking force generated by the brake 262 of the front wheel drive unit 242 and the absolute value of the output or the braking force generated by the rear wheel drive unit 244 from (i) the absolute value of the output generated by the motor 252 of the front wheel drive unit 242, becomes the required driving force. Accordingly, the drive control section 328 can control the operation of the drive unit 140 such that the magnitude of the driving force output from the drive unit 140 matches the magnitude of the required driving force.

For example, when the required driving force for cruise-driving the moving body 100 at a specific speed is 500 N, in the diagnosis mode, the drive control section 328 controls the operation of the front wheel drive unit 242 such that the motor 252 of the front wheel drive unit 242 generates driving force of 750 N and the brake 262 of the front wheel drive unit 242 generates braking force of 50 N. In addition, the operation of the rear wheel drive unit 244 is controlled such that the rear wheel drive unit 244 outputs braking force of 200 N. The motor 252 of the rear wheel drive unit 244 may generate the braking force of the rear wheel drive unit 244, the brake 262 of the rear wheel drive unit 244 may generate the braking force of the rear wheel drive unit 244, and the motor 252 and the brake 262 of the rear wheel drive unit 244 may generate the braking force of the rear wheel drive unit 244.

Next, in S824, the diagnosis processing of the diagnosis target is executed. For example, the diagnosis processing execution section 348 collects data from the measurement unit 150 and analyzes the data to detect a sign of a failure of the diagnosis target and determine the degree of deterioration of the diagnosis target. Details of the diagnosis processing will be described later.

When the diagnosis processing ends in S824, the operation mode of the moving body 100 shifts from the diagnosis mode to the normal mode in S826. For example, the drive control section 328 adjusts the output distribution of the front wheel drive unit 242 and the rear wheel drive unit 244. The operation mode of the moving body 100 shifts from the diagnosis mode to the normal mode, and the moving body 100 travels in the normal mode. Accordingly, the processing ends.

Figure 9:
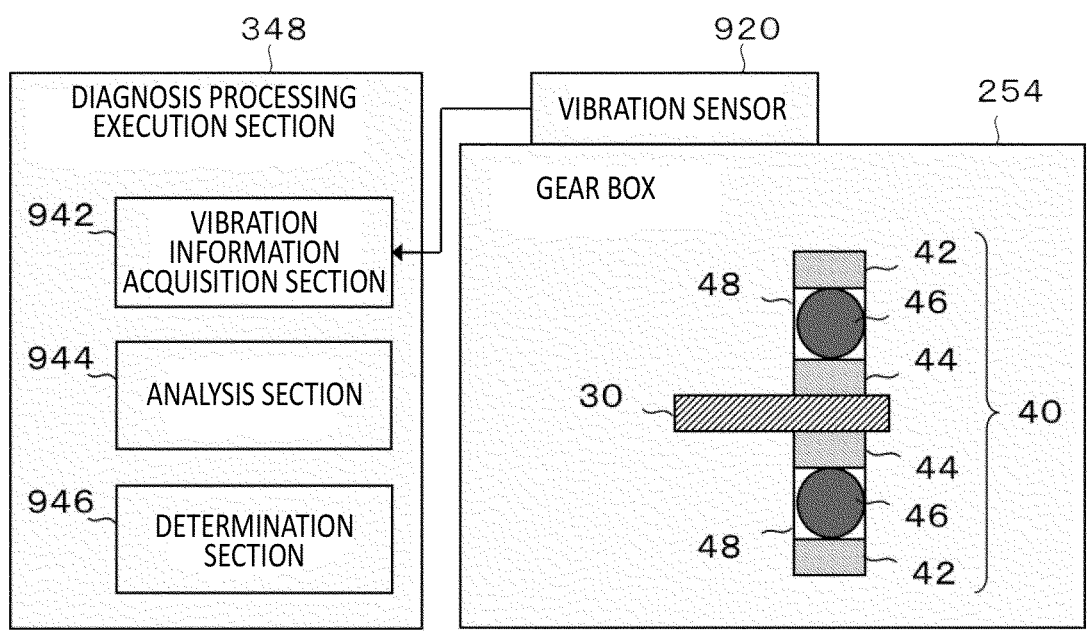
FIG. 9 illustrates an example of an internal structure of a diagnosis processing execution section 348.
Figure 10:
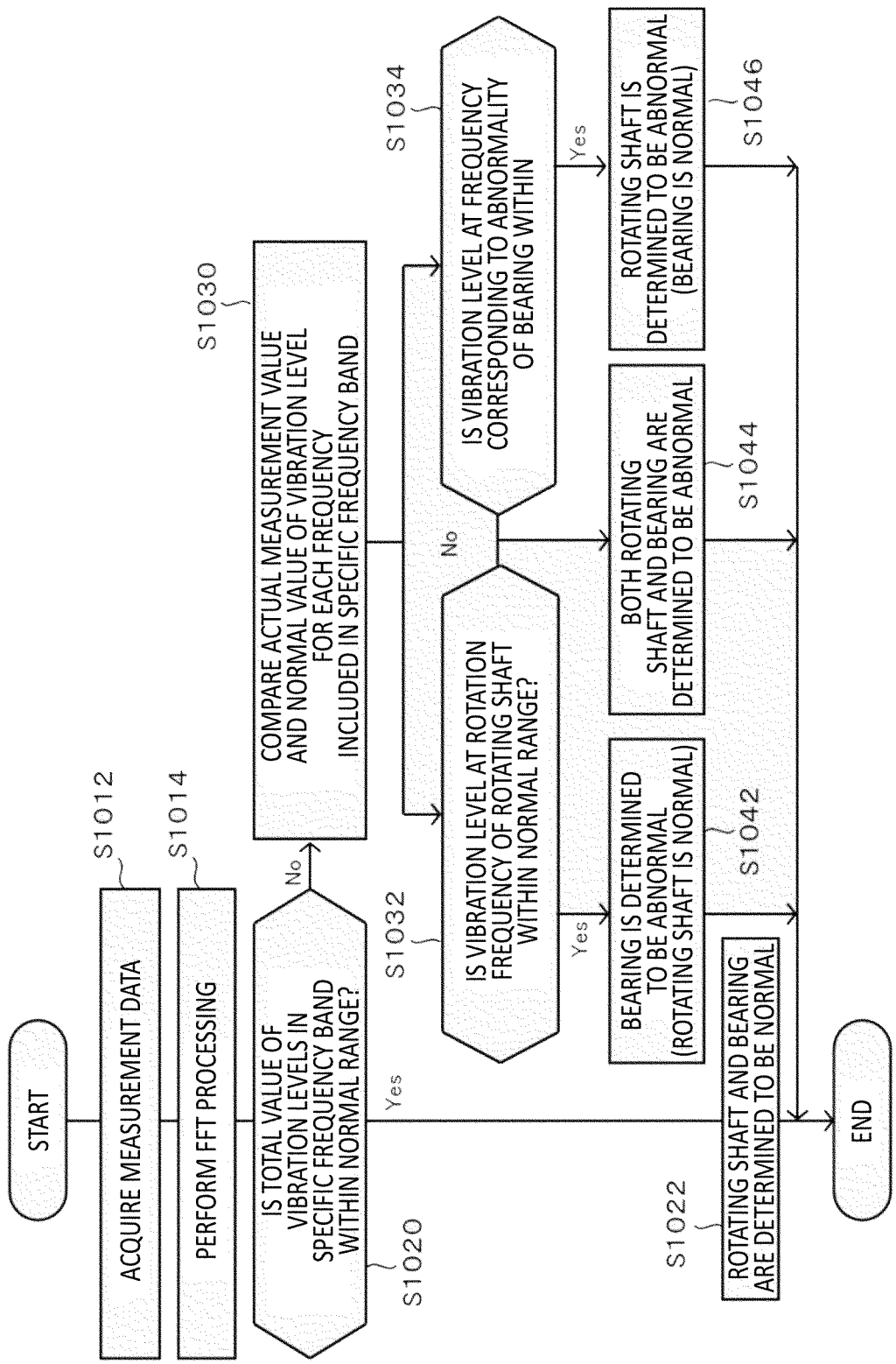
FIG. 10 schematically illustrates an example of information processing in the diagnosis processing execution section 348.

Details of the diagnosis processing execution section 348 will be described with reference to FIGS. 9 and 10 by using, as an example, a case where the diagnosis processing execution section 348 diagnoses a bearing 40 included in the gear box 254. FIG. 9 illustrates an example of an internal structure of the diagnosis processing execution section 348. FIG. 10 schematically illustrates an example of information processing in the diagnosis processing execution section 348.

As illustrated in FIG. 9, in the present embodiment, the gear box 254 includes a rotating shaft 30 and the bearing 40. In the present embodiment, the bearing 40 includes an outer ring 42, an inner ring 44, one or more rolling elements 46, and a retainer 48. The outer ring 42 and the inner ring 44 may be referred to as bearing rings. A vibration sensor 920 is attached to the gear box 254. In the present embodiment, the diagnosis processing execution section 348 includes a vibration information acquisition section 942, an analysis section 944, and a determination section 946.

In the present embodiment, the rotating shaft 30 rotates. The rotating shaft 30 may rotate at a predetermined frequency (may be referred to as a rotation frequency).

In the present embodiment, the bearing 40 rotatably supports the rotating shaft 30. In the bearing 40, a part thereof (may be referred to as a coupling portion) is coupled to the rotating shaft 30. The bearing 40 may be coupled with the rotating shaft 30 by fitting or frictional force.

In the present embodiment, the outer ring 42 is fixed to a part of the gear box 254. Each section of the bearing 40 is accommodated inside the outer ring 42.

In the present embodiment, the inner ring 44 is coupled to the rotating shaft 30. Accordingly, when the rotating shaft 30 rotates, the inner ring 44 rotates by the force transmitted from the rotating shaft 30. The inner ring 44 has, for example, a ring shape. A through hole penetrating the inner ring 44 is formed in a substantially central portion of the inner ring 44. The rotating shaft 30 is inserted into the through hole of the inner ring 44. The rotating shaft 30 may be press-fitted into the through hole of the inner ring 44. Accordingly, the rotating shaft 30 and the inner ring 44 are coupled.

In the present embodiment, the rolling elements 46 are configured to be rotatable or rollable inside the outer ring 42 and the inner ring 44. Accordingly, when the rotating shaft 30 rotates, the rolling elements 46 roll inside the outer ring 42 and the inner ring 44.

In the present embodiment, the retainer 48 holds one or more rolling elements 46. The retainer 48 may hold the one or more rolling elements 46 such that the one or more rolling elements 46 do not come into contact with each other.

In the present embodiment, the vibration sensor 920 measures a vibration waveform of the gear box 254. The vibration sensor 920 measures the vibration waveform of the gear box 254 for a predetermined period (may be referred to as a sampling period), for example. The vibration sensor 920 outputs information (may be referred to as vibration information) indicating the measured vibration waveform to the diagnosis processing execution section 348. The vibration information includes, for example, the waveform information of vibration of the rotating shaft 30. The vibration information includes, for example, the waveform information of vibration of the bearing 40. The vibration information includes, for example, the waveform information of vibration of the inner ring 44.

In the present embodiment, the vibration information acquisition section 942 acquires the vibration information output by the vibration sensor 920. The vibration information includes, for example, information indicating the magnitude of vibration at each of one or more sampling times. The vibration information acquisition section 942 outputs the vibration information to the analysis section 944.

In the present embodiment, the analysis section 944 analyzes the vibration information. The analysis section 944 may perform Fourier transform on the vibration information. The analysis section 944 may execute fast Fourier transform processing. Accordingly, the analysis section 944 can decompose the vibration waveform indicated by the vibration information into a plurality of frequency components. When the vibration waveform is decomposed into the plurality of frequency components, a vibration level indicating the degree of vibration for each frequency component is derived. The analysis section 944 may derive a plurality of vibration levels regarding each of the plurality of frequency components. The analysis section 944 may derive a vibration level regarding a specific frequency component.

The degree of vibration is expressed by, for example, an amplitude, a vibration speed, or a vibration acceleration. The vibration level is expressed by, for example, a displacement amplitude, a speed amplitude, or an acceleration amplitude. The vibration level may indicate a power spectrum of the vibration.

The analysis section 944 outputs values of one or more vibration levels regarding one or more frequency components. The analysis section 944 may output the value of the frequency and the value of the vibration level in association with each other for each of the one or more frequency components.

The analysis section 944 may output information indicating the value of the vibration level corresponding to the rotation frequency of the rotating shaft 30. The analysis section 944 may output information indicating the value of the vibration level for each of one or more frequency components included in a range (may be referred to as a low frequency band) from the first frequency, which is a frequency smaller than the rotation frequency of the rotating shaft 30, to the rotation frequency.

In the normal rotating shaft 30 and bearing 40, the rotating shaft 30 and the inner ring 44 of the bearing 40 are firmly fitted, and the rotation speed of the rotating shaft 30 and the rotation speed of the bearing 40 are substantially the same. For example, as the deterioration of the rotating shaft 30 and the bearing 40 progresses, the fitting between the rotating shaft 30 and the inner ring 44 of the bearing 40 becomes loose due to wear. As a result, as compared with a case where the rotating shaft 30 and the bearing 40 are normal, the magnitude of the vibration level of the frequency component on the lower frequency side than the rotation speed of the rotating shaft 30 increases.

The analysis section 944 may output (i) information indicating the value of the vibration level corresponding to the rotation frequency of the rotating shaft 30 and (ii) information indicating the value of the vibration level corresponding to at least one frequency included in the low frequency band. A frequency range including the low frequency band and the rotation frequency of the rotating shaft 30 may be referred to as a target frequency band.

The low frequency band may be a set of a plurality of frequency bands. For example, the low frequency band includes (i) a range from the first frequency to the rotation frequency, and (ii) a range from a frequency that is smaller by a predetermined value than a frequency (may be referred to as an n-th order frequency), which is n times (n is an integer of 2 or more) the rotation frequency of the rotating shaft 30, to the n-th order frequency. The target frequency band may be a low frequency band including one or more frequency bands and a frequency range including the rotation frequency and the n-th order frequency of the rotating shaft 30.

The magnitude of the first frequency may be 70% or more and 95% or less of the magnitude of the rotation frequency of the rotating shaft 30. The magnitude of the first frequency may be 75% or more and 90% or less of the magnitude of the rotation frequency of the rotating shaft 30. The magnitude of the first frequency may be 80% or more and 85% or less of the magnitude of the rotation frequency of the rotating shaft 30. The magnitude of the first frequency may be 80% or more of the magnitude of the rotation frequency of the rotating shaft 30.

In the present embodiment, the determination section 946 determines the presence or absence of an abnormality in at least one of the rotating shaft 30 and the bearing 40 on the basis of the values (may be referred to as actual measurement values) of the plurality of vibration levels output by the analysis section 944. Examples of the abnormality of the bearing 40 include an abnormality of the inner ring 44, an abnormality of the rolling elements 46, and the like. According to the present embodiment, when there is an abnormality of the outer ring 42, the determination section 946 can detect the abnormality as an abnormality of the inner ring 44, for example. Accordingly, the determination section 946 can also detect the abnormality of the outer ring 42.

In one embodiment, for each of one or more frequencies included in the above-described low frequency band, the determination section 946 compares the actual measurement value of the vibration level for each frequency component with the normal value. For each of one or more frequencies included in the above-described target frequency band, the determination section 946 may compare the actual measurement value of the vibration level for each frequency component with the normal value.

The determination section 946 may acquire the normal value of the vibration level for each frequency component with reference to the normal value storage section 366. For example, the identification information of the bearing 40 to be diagnosed and the frequency to be subjected to the comparison processing are used as keys to extract the normal value of the vibration level associated with the keys from the information contained in the normal value storage section 366.

The number of frequency components included in the low frequency band depends on the resolution of the Fourier transform in the analysis section 944. In this regard, the resolution may be set such that the resolution of the Fourier transform in the analysis section 944 is the same between the case of acquiring the actual measurement value of the vibration level and the case of measuring the normal value of the vibration level.

For example, the determination section 946 determines the presence or absence of an abnormality in at least one of the rotating shaft 30 and the bearing 40 on the basis of the comparison result. The determination section 946 may determine the presence or absence of an abnormality in at least one of the rotating shaft 30 and the bearing 40 on the basis of the ratio of the actual measurement value to the normal value.

The determination section 946 may determine the presence or absence of the abnormality of the rotating shaft 30 on the basis of the comparison result between the actual measurement value of the vibration level and the normal value at the rotation frequency of the rotating shaft 30. The determination section 946 may determine the presence or absence of the abnormality of the rotating shaft 30 on the basis of the ratio of the actual measurement value to the normal value at the rotation frequency. For example, when the ratio of the actual measurement value to the normal value at the rotation frequency is larger than a predetermined value, the determination section 946 determines that an abnormality has occurred in the rotating shaft 30.

The determination section 946 may determine the presence or absence of the abnormality of the bearing 40 on the basis of the comparison result between the actual measurement value of the vibration level and the normal value at the frequency (may be referred to as a second frequency) corresponding to the abnormality of the bearing 40. The determination section 946 may determine the presence or absence of the abnormality of the bearing 40 on the basis of the ratio of the actual measurement value to the normal value at the second frequency. For example, when the ratio of the actual measurement value to the normal value at the second frequency is larger than the predetermined value, the determination section 946 determines that an abnormality has occurred in the bearing 40.

For example, when the ratio of the actual measurement value to the normal value is 1.4 or more, it is determined that an abnormality has occurred. When the ratio of the actual measurement value to the normal value is 1.5 or more, it may be determined that an abnormality has occurred, and when the ratio of the actual measurement value to the normal value is 1.6 or more, it may be determined that an abnormality has occurred.

The present inventors have found that as an abnormality or deterioration progresses in the bearing 40, the vibration level at a frequency smaller than the rotation frequency of the rotating shaft 30 increases. Although the cause of the above phenomenon is not necessarily clear, it is considered to be due to the fact that as an abnormality or deterioration progresses in the bearing 40, it becomes difficult for the inner ring 44 of the bearing 40 to rotate at the same rotation frequency as the rotating shaft 30.

In this regard, according to the present embodiment, the actual measurement value and the normal value are compared not only for the vibration level at the rotation frequency of the rotating shaft 30 but also for the vibration level at the frequency included in the low frequency band described above. Accordingly, the determination section 946 can determine whether an abnormality has occurred in the rotating shaft 30, the bearing 40, or both the rotating shaft 30 and the bearing 40. As a result, the place where the abnormality occurs can be specified to some extent.

In another embodiment, the determination section 946 compares the total value of the actual measurement values of respective vibration levels of one or more frequency components included in the low frequency band described above with the normal value of the total value. For example, the determination section 946 determines the presence or absence of an abnormality in at least one of the rotating shaft 30 and the bearing 40 on the basis of the comparison result.

More specifically, the determination section 946 adds the actual measurement values of respective vibration levels of one or more frequency components included in the low frequency band to calculate the total value of the actual measurement values. The determination section 946 determines whether the relationship between the total value of the actual measurement values and the normal value of the total value meets a predetermined condition. Examples of the predetermined condition include a condition that the total value of the actual measurement values is less than twice the normal value of the total value, a condition that the total value of the actual measurement values is less than 1.8 times the normal value of the total value, and the like.

In one embodiment, when it is determined that the relationship between the total value of the actual measurement values and the normal value of the total value meets the predetermined condition, the determination section 946 determines that both the rotating shaft 30 and the bearing 40 are normal. In another embodiment, when it is determined that the relationship between the total value of the actual measurement values and the normal value of the total value does not meet the predetermined condition, the determination section 946 determines that an abnormality has occurred in at least one of the rotating shaft 30 and the bearing 40.

When it is determined that the relationship between the total value of the actual measurement values and the normal value of the total value does not meet the predetermined condition, the determination section 946 (i) compares the actual measurement value of the vibration level at the rotation frequency of the rotating shaft 30 with the normal value, and (ii) compares the actual measurement value of the vibration level for each frequency component with the normal value for each of one or more frequency components included in the low frequency band. The determination section 946 determines whether an abnormality has occurred in the rotating shaft 30 on the basis of the comparison result. The determination section 946 determines whether an abnormality has occurred in the bearing 40 on the basis of the comparison result. Accordingly, the place where the abnormality occurs can be specified to some extent.

Details of the comparison processing may be as described above. For example, the determination section 946 determines the presence or absence of the abnormality of the rotating shaft 30 on the basis of the ratio of the actual measurement value to the normal value at the rotation frequency. For example, when the ratio of the actual measurement value to the normal value at the rotation frequency is larger than a predetermined value, the determination section 946 determines that an abnormality has occurred in the rotating shaft 30.

The determination section 946 may determine the presence or absence of the abnormality of the bearing 40 on the basis of the comparison result between the actual measurement value of the vibration level and the normal value at the frequency (may be referred to as a second frequency) corresponding to the abnormality of the bearing 40. The determination section 946 may determine the presence or absence of the abnormality of the bearing 40 on the basis of the ratio of the actual measurement value to the normal value at the second frequency. For example, when the ratio of the actual measurement value to the normal value at the second frequency is larger than the predetermined value, the determination section 946 determines that an abnormality has occurred in the bearing 40.

For example, when the ratio of the actual measurement value to the normal value is 1.4 or more, it is determined that an abnormality has occurred. When the ratio of the actual measurement value to the normal value is 1.5 or more, it may be determined that an abnormality has occurred, and when the ratio of the actual measurement value to the normal value is 1.6 or more, it may be determined that an abnormality has occurred.

The bearing 40 may be an example of the equipment. The inner ring 44 may be an example of the rotating component. The gear box 254 may be an example of the equipment.

FIG. 10 schematically illustrates an example of information processing in the diagnosis processing execution section 348. According to the present embodiment, first, in S1012, the vibration information acquisition section 942 acquires the vibration information of the gear box 254 from the vibration sensor 920. Next, in S1014, the analysis section 944 performs Fourier transform on the vibration information of the gear box 254. Accordingly, the vibration waveform indicated by the vibration information is decomposed into a plurality of frequency components. In addition, a value of a vibration level (for example, a variation amplitude, a speed amplitude, or an acceleration amplitude) is calculated for each of the plurality of frequencies.

Next, in S1020, the determination section 946 adds the values of respective vibration levels of one or more frequency components included in the low frequency band. Accordingly, the total value of the actual measurement values of the vibration levels is calculated. The determination section 946 may calculate the total value of the actual measurement values of the vibration levels by adding the values of respective vibration levels of one or more frequency components included in the target frequency band.

In S1020, the determination section 946 refers to, for example, the normal value storage section 366 to acquire the normal value of the total value. The determination section 946 determines whether the relationship between the total value of the actual measurement values and the normal value of the total value meets a predetermined condition. As described above, the predetermined condition may be a condition that the total value of the actual measurement values is less than twice the normal value of the total value.

When it is determined that the relationship between the total value of the actual measurement values and the normal value of the total value meets the predetermined condition (Yes in S1020), in S1022, the determination section 946 determines that both the rotating shaft 30 and the bearing 40 are normal. Accordingly, the diagnosis processing ends.

On the other hand, when it is determined that the relationship between the total value of the actual measurement values and the normal value of the total value does not meet the predetermined condition (No in S1020), it is determined that an abnormality has occurred in at least one of the rotating shaft 30 and the bearing 40. In this regard, the determination section 946 executes processing for specifying an abnormal portion.

For example, first, in S1030, for each of one or more frequencies included in the low frequency band, the determination section 946 compares the actual measurement value of the vibration level for each frequency component with the normal value of the vibration level for each frequency component. The determination section 946 may compare the actual measurement value of the vibration level for each frequency component at the above-described second frequency among one or more frequencies included in the low frequency band with the normal value of the vibration level for each frequency component. In addition, the determination section 946 compares the actual measurement value of the vibration level for each frequency component at the rotation frequency of the rotating shaft 30 with the normal value of the vibration level for each frequency component.

In step S1032, the determination section 946 determines whether the vibration level of each frequency component at the rotation frequency of the rotating shaft 30 is within a normal range. For example, it is determined whether the ratio of the actual measurement value of the vibration level for each frequency component to the normal value of the vibration level for each frequency component at the rotation frequency of the rotating shaft 30 is smaller than a predetermined value. For example, when the above-described ratio is smaller than the predetermined value, the determination section 946 determines that the vibration level of each frequency component at the rotation frequency of the rotating shaft 30 is within the normal range.

When it is determined that the vibration level of each frequency component at the rotation frequency of the rotating shaft 30 is within the normal range (Yes in S1032), in S1042, the determination section 946 determines that the rotating shaft 30 is normal and an abnormality has occurred in the bearing 40. Accordingly, the diagnosis processing ends.

On the other hand, when it is determined that the vibration level of each frequency component at the rotation frequency of the rotating shaft 30 is not within the normal range (No in S1032), in S1044, the determination section 946 determines that an abnormality has occurred in the rotating shaft 30 and the bearing 40. Accordingly, the diagnosis processing ends.

Similarly, in S1034, the determination section 946 determines whether the vibration level of each frequency component at each frequency is within the normal range for each of one or more frequencies included in the low frequency band or for the second frequency. For example, it is determined whether the ratio of the actual measurement value of the vibration level for each frequency component to the normal value of the vibration level for each frequency component at each frequency is smaller than a predetermined value. For example, when the above-described ratio is smaller than the predetermined value, the determination section 946 determines that the vibration level of each frequency component at each frequency is within the normal range.

When it is determined for each of one or more frequencies included in the frequency band or the second frequency that the vibration level of each frequency component at each frequency is within the normal range (Yes in S1034), in S1046, the determination section 946 determines that the bearing 40 is normal and an abnormality has occurred in the rotating shaft 30. Accordingly, the diagnosis processing ends.

On the other hand, when it is determined for each of one or more frequencies included in the frequency band or the second frequency that the vibration level of each frequency component at each frequency is not within the normal range (No in S1034), in S1044, the determination section 946 determines that an abnormality has occurred in the rotating shaft 30 and the bearing 40. Accordingly, the diagnosis processing ends.

Figure 11:
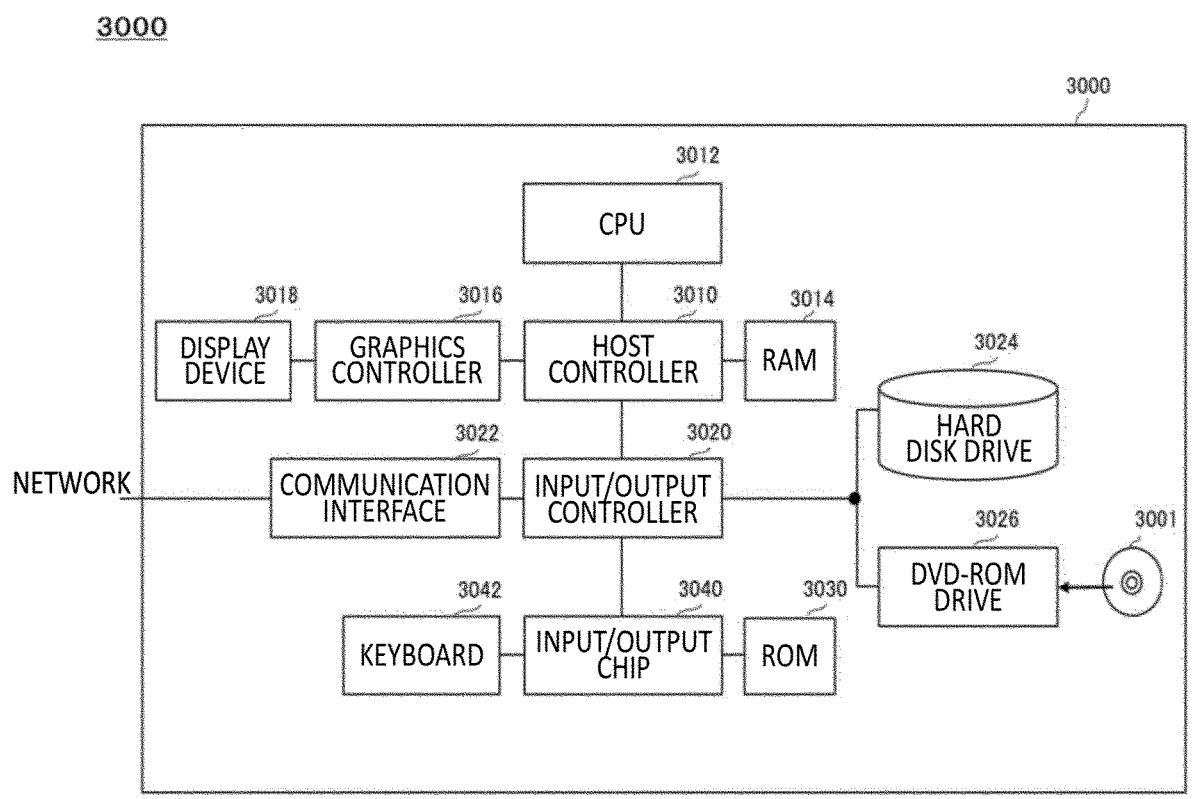
FIG. 11 schematically illustrates an example of an internal configuration of a computer 3000.

FIG. 11 illustrates an example of a computer 3000 in which a plurality of embodiments of the present invention may be entirely or partially embodied. For example, at least a part of the moving body 100 is realized by the computer 3000. For example, at least a part of the control unit 160 is realized by the computer 3000. For example, at least a part of the various ECUs described in relation to FIG. 10 is realized by the computer 3000.

A program that is installed in the computer 3000 can cause the computer 3000 to perform an operation associated with an apparatus according to the embodiment of the present invention or to function as one or more "units" of the apparatus, or cause the computer 3000 to perform the operation or the one or more units thereof, and/or cause the computer 3000 to perform processes according to the embodiment of the present invention or steps thereof. Such a program may be performed by the CPU 3012 to cause the computer 3000 to perform particular operations associated with some or all of the blocks of flowcharts and block diagrams described herein.

The computer 3000 in accordance with the present embodiment includes a CPU 3012, a RAM 3014, a graphics processing unit (GPU) 3016, and a display device 3018, which are mutually connected by a host controller 3010. The computer 3000 also includes an input/output unit such as a communication interface 3022, a hard disk drive 3024, a DVD-ROM drive 3026, and an IC card drive, which are connected to the host controller 3010 via the input/output controller 3020. The computer also includes legacy input/output units such as a ROM 3030 and a keyboard 3042, which are connected to the input/output controller 3020 through an input/output chip 3040.

The CPU 3012 operates according to programs stored in the ROM 3030 and the RAM 3014, thereby controlling each unit. The GPU 3016 acquires image data generated by the CPU 3012 on a frame buffer or the like provided in the RAM 3014 or in itself, and causes the image data to be displayed on a display device 3018.

The communication interface 3022 communicates with other electronic devices via a network. The hard disk drive 3024 stores programs and data that are used by the CPU 3012 within the computer 3000. The DVD-ROM drive 3026 reads the programs or the data from the DVD-ROM 3001, and provides the hard disk drive 3024 with the programs or the data via the RAM 3014. The IC card drive reads programs and data from an IC card and/or writes programs and data into the IC card.

The ROM 3030 stores therein a boot program or the like that is performed by the computer 3000 at the time of activation, and/or a program depending on the hardware of the computer 3000. The input/output chip 3040 may also connect various input/output units to the input/output controller 3020 via a parallel port, a serial port, a keyboard port, a mouse port or the like.

A program is provided by a computer readable storage medium, such as the DVD-ROM 3001 or the IC card. The program is read from the computer readable storage medium, installed into the hard disk drive 3024, RAM 3014, or ROM 3030, which are also examples of computer readable storage medium, and performed by the CPU 3012. The information processing described in these programs is read into the computer 3000, resulting in cooperation between a program and the above described various types of hardware resources. An apparatus or method may be constituted by realizing the operation or processing of information in accordance with the usage of the computer 3000.

For example, when communication is performed between the computer 3000 and an external device, the CPU 3012 may perform a communication program loaded onto the RAM 3014 to instruct communication processing to the communication interface 3022, on the basis of the processing described in the communication program. The communication interface 3022, under the control of the CPU 3012, reads the transmission data stored in the transmission buffer area provided in the recording medium such as RAM 3014, hard disk drive 3024, DVD-ROM 3001, or IC card, and sends the read transmission data to the network or writes the received data from the network to the reception buffer area provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, etc., and perform various types of processing on the data on the RAM 3014. The CPU 3012 may then write back the processed data to the external recording medium.

Various types of information such as various types of programs, data, tables, and databases may be stored in a recording medium and subjected to information processing.

The CPU 3012 may perform various types of processing on the data read from the RAM 3014, which includes various types of operations, information processing, condition judging, conditional branch, unconditional branch, search/replacement of information, etc., as described throughout this disclosure and designated by a command sequence of programs, and writes the result back to the RAM 3014. In addition, the CPU 3012 may search for information in a file, a database, etc., in the recording medium. For example, when a plurality of entries, each having an attribute value of a first attribute associated with an attribute value of a second attribute, are stored in the recording medium, the CPU 3012 may search for an entry whose attribute value of the first attribute matches the condition a designated condition, from among the plurality of entries, and read the attribute value of the second attribute stored in the entry, thereby obtaining the attribute value of the second attribute associated with the first attribute satisfying the predetermined condition.

The above-described program or software modules may be stored in the computer readable storage medium on or near the computer 3000. In addition, a recording medium such as a hard disk or a RAM provided in a server system connected to a dedicated communication network or the Internet can be used as the computer readable storage medium, thereby providing the program to the computer 3000 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each processing performed by an apparatus, system, program, and method shown in the claims, embodiments, or diagrams can be performed in any order as long as the order is not indicated by "prior to," "before," or the like and as long as the output from previous processing is not used in later processing. Even if the process flow is described using phrases such as "first" or "next" in the claims, embodiments, or diagrams, it does not necessarily mean that the process must be performed in this order.

EXPLANATION OF REFERENCES

20: user; 30: rotating shaft; 40: bearing; 42: outer ring; 44: inner ring; 46: rolling element; 48: retainer; 100: moving body; 120: input/output unit; 130: thrust generation unit; 140: drive unit; 150: measurement unit; 160: control unit; 162: control section; 164: diagnosis section; 166: storage section; 220: vehicle body; 232: front wheel; 234: rear wheel; 242: front wheel drive unit; 244: rear wheel drive unit; 252: motor; 254: gear box; 256: shaft; 262: brake; 322: input/output control section; 324: required driving force decision section; 328: drive control section; 342: diagnosis aspect decision section; 344: diagnosis time decision section; 346: start determination section; 348: diagnosis processing execution section; 362: diagnosis interval storage section; 366: normal value storage section; 920: vibration sensor; 942: vibration information acquisition section; 944: analysis section; 946: determination section; 3000: computer; 3001: DVD-ROM; 3010: host controller; 3012: CPU; 3014: RAM; 3016: GPU; 3018: display device; 3020: input/output controller; 3022: communication interface; 3024:

What is claimed is:

1. A diagnostic apparatus configured to diagnose a state of equipment including a rotating component configured to rotate by force transmitted from a rotating shaft, the diagnostic apparatus comprising:
a vibration information acquisition section configured to acquire vibration information including waveform information of vibration of the rotating component;
an analysis section configured to decompose a vibration waveform of the vibration into a plurality of frequency components and output values of a plurality of vibration levels indicating degrees of the vibration for each of the frequency components; and
a determination section configured to determine a presence or absence of an abnormality in at least one of the rotating shaft and the rotating component on a basis of the values of the plurality of vibration levels output by the analysis section, wherein
the determination section is configured to
for each of one or more frequencies included in a range from a first frequency, which is a frequency smaller than a rotation frequency of the rotating shaft, to the rotation frequency, perform comparison of a value of a vibration level for each of the frequency components with a normal value of the vibration level for each of the frequency components, and
determine a presence or absence of an abnormality in at least one of the rotating shaft and the rotating component on a basis of a result of the comparison.

2. The diagnostic apparatus according to claim 1, wherein the determination section is configured to
when a ratio of a value of a vibration level for each of the frequency components at a second frequency, which is a frequency corresponding to an abnormality of the rotating component, to a normal value of the vibration level for each of the frequency components at the second frequency is larger than a predetermined value,
determine that an abnormality has occurred in the rotating component.

3. The diagnostic apparatus according to claim 1, wherein the determination section is configured to
when a ratio of a value of a vibration level for each of the frequency components at the rotation frequency to a normal value of the vibration level for each of the frequency components at the rotation frequency is larger than a predetermined value,
determine that an abnormality has occurred in the rotating shaft.

4. The diagnostic apparatus according to claim 1, wherein the degree of the vibration is expressed by an amplitude, a vibration speed, or a vibration acceleration.

5. The diagnostic apparatus according to claim 1, wherein the equipment is a bearing which rotatably supports the rotating shaft, and
the rotating component is an inner ring of the bearing.

6. The diagnostic apparatus according to claim 1, wherein the equipment includes the rotating shaft and the rotating component.

7. A moving body comprising:
the diagnostic apparatus according to claim 1; and
the equipment to be diagnosed by the diagnostic apparatus.

8. A diagnostic apparatus configured to diagnose a state of equipment including a rotating component configured to rotate by force transmitted from a rotating shaft, the diagnostic apparatus comprising:
a vibration information acquisition section configured to acquire vibration information including waveform information of vibration of the rotating component;
an analysis section configured to decompose a vibration waveform of the vibration into a plurality of frequency components and output values of a plurality of vibration levels indicating degrees of the vibration for each of the frequency components; and
a determination section configured to determine a presence or absence of an abnormality in at least one of the rotating shaft and the rotating component on a basis of the values of the plurality of vibration levels output by the analysis section, wherein
the determination section is configured to
calculate a total value by adding values of respective vibration levels of one or more frequencies included in a range from a first frequency, which is a frequency smaller than a rotation frequency of the rotating shaft, to the rotation frequency,
determine whether a relationship between the calculated total value and a normal value of the total value meets a predetermined condition, and
when it is determined that the relationship between the total value and the normal value of the total value does not meet the predetermined condition, determine that an abnormality has occurred in at least one of the rotating shaft and the rotating component.

9. The diagnostic apparatus according to claim 8, wherein the determination section is configured to
when it is determined that the relationship between the total value and the normal value of the total value does not meet the predetermined condition,
perform comparison, for each of the one or more frequencies, of a value of a vibration level for each of the frequency components with a normal value of a vibration level for each of the frequency components, and
determine a presence or absence of an abnormality of the rotating shaft and the rotating component on a basis of a result of the comparison.

10. The diagnostic apparatus according to claim 9, wherein
the determination section is configured to
when a ratio of a value of a vibration level for each of the frequency components at a second frequency, which is a frequency corresponding to an abnormality of the rotating component, to a normal value of the vibration level for each of the frequency components at the second frequency is larger than a predetermined value,
determine that an abnormality has occurred in the rotating component.

11. The diagnostic apparatus according to claim 10, wherein
the determination section is configured to
when a ratio of a value of a vibration level for each of the frequency components at the rotation frequency to a normal value of the vibration level for each of the frequency components at the rotation frequency is larger than a predetermined value,
determine that an abnormality has occurred in the rotating shaft.

12. The diagnostic apparatus according to claim 9, wherein
the determination section is configured to
when a ratio of a value of a vibration level for each of the frequency components at the rotation frequency to a normal value of the vibration level for each of the frequency components at the rotation frequency is larger than a predetermined value,
determine that an abnormality has occurred in the rotating shaft.

13. The diagnostic apparatus according to claim 8, wherein
the determination section is configured to
when it is determined that the relationship between the total value and the normal value of the total value meets the predetermined condition,
determine that the rotating shaft and the rotating component are normal.

14. The diagnostic apparatus according to claim 1, wherein
the predetermined condition includes a condition that the total value is less than twice the normal value of the total value.

15. The diagnostic apparatus according to claim 8, wherein
the degree of the vibration is expressed by an amplitude, a vibration speed, or a vibration acceleration.

16. The diagnostic apparatus according to claim 8, wherein
the equipment is a bearing which rotatably supports the rotating shaft, and
the rotating component is an inner ring of the bearing.

17. The diagnostic apparatus according to claim 8, wherein
the equipment includes the rotating shaft and the rotating component.

18. A moving body comprising:
the diagnostic apparatus according to claim 8; and
the equipment to be diagnosed by the diagnostic apparatus.

19. A non-transitory computer readable storage medium having recorded thereon a program that causes a computer to function as a diagnostic apparatus configured to diagnose a state of equipment including a rotating component configured to rotate by force transmitted from a rotating shaft, wherein
the diagnostic apparatus includes:
a vibration information acquisition section configured to acquire vibration information including waveform information of vibration of the rotating component;
an analysis section configured to decompose a vibration waveform of the vibration into a plurality of frequency components and output values of a plurality of vibration levels indicating degrees of the vibration for each of the frequency components; and
a determination section configured to determine a presence or absence of an abnormality in at least one of the rotating shaft and the rotating component on a basis of the values of the plurality of vibration levels output by the analysis section,
the determination section is configured to
(A) for each of one or more frequencies included in a range from a first frequency, which is a frequency smaller than a rotation frequency of the rotating shaft, to the rotation frequency, perform comparison of a value of a vibration level for each of the frequency components with a normal value of the vibration level for each of the frequency components, and determine a presence or absence of an abnormality in at least one of the rotating shaft and the rotating component on a basis of a result of the comparison, and
(B) calculate a total value by adding values of respective vibration levels of one or more frequencies included in a range from a first frequency, which is a frequency smaller than a rotation frequency of the rotating shaft, to the rotation frequency, determine whether a relationship between the calculated total value and a normal value of the total value meets a predetermined condition, and when it is determined that the relationship between the total value and the normal value of the total value does not meet the predetermined condition, determine that an abnormality has occurred in at least one of the rotating shaft and the rotating component.

20. A diagnostic method for diagnosing a state of equipment including a rotating component configured to rotate by force transmitted from a rotating shaft, the diagnostic method comprising:
acquiring vibration information including waveform information of vibration of the rotating component;
analyzing by decomposing a vibration waveform of the vibration into a plurality of frequency components and outputting values of a plurality of vibration levels indicating degrees of the vibration for each of the frequency components; and
determining a presence or absence of an abnormality in at least one of the rotating shaft and the rotating component on a basis of the values of the plurality of vibration levels output by the analyzing, wherein
the determining includes
(A) for each of one or more frequency components included in a range from a first frequency, which is a frequency smaller than a rotation frequency of the rotating shaft, to the rotation frequency, performing comparison of a value of a vibration level for each of the frequency components with a normal value of the vibration level for each of the frequency components, and
determining a presence or absence of an abnormality in at least one of the rotating shaft and the rotating component on a basis of a result of the comparison, or
(B) calculating a total value by adding values of respective vibration levels of one or more frequency components included in a range from a first frequency, which is a frequency smaller than a rotation frequency of the rotating shaft, to the rotation frequency, determining whether a relationship between the calculated total value and a normal value of the total value meets a predetermined condition, and when it is determined that the relationship between the total value and the normal value of the total value does not meet the predetermined condition, determining that an abnormality has occurred in at least one of the rotating shaft and the rotating component.

* * * * *